United States Patent
Won et al.

(10) Patent No.: US 9,628,815 B2
(45) Date of Patent: Apr. 18, 2017

(54) METHOD AND APPARATUS FOR ENCODING/DECODING THE MOTION VECTORS OF A PLURALITY OF REFERENCE PICTURES, AND APPARATUS AND METHOD FOR IMAGE ENCODING/DECODING USING SAME

(71) Applicant: SK TELECOM CO., LTD., Seoul (KR)

(72) Inventors: Kwanghyun Won, Bucheon-si (KR); Hayoon Kim, Seongnam-si (KR); Byeungwoo Jeon, Seongnam-si (KR); Joohee Moon, Seoul (KR); Yunglyul Lee, Seoul (KR); Haekwang Kim, Seoul (KR); Jungyoup Yang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/692,356

(22) Filed: Apr. 21, 2015

(65) Prior Publication Data

US 2015/0229925 A1 Aug. 13, 2015

Related U.S. Application Data

(63) Continuation of application No. 13/124,070, filed as application No. PCT/KR2009/005713 on Oct. 7, 2009, now Pat. No. 9,137,546.

(30) Foreign Application Priority Data

Oct. 14, 2008 (KR) .................. 10-2008-0100553

(51) Int. Cl.
*H04N 19/513* (2014.01)
*H04N 19/573* (2014.01)
(Continued)

(52) U.S. Cl.
CPC ......... *H04N 19/573* (2014.11); *H04N 19/124* (2014.11); *H04N 19/52* (2014.11);
(Continued)

(58) Field of Classification Search
CPC ...... H04N 19/52; H04N 19/61; H04N 19/573; H04N 19/105; H04N 19/513;
(Continued)

(56) References Cited

U.S. PATENT DOCUMENTS 6,108,449 A * 8/2000 Sekiguchi ............ H04N 19/105
375/E7.081
7,526,027 B2 * 4/2009 Sekiguchi ............ H04N 19/139
375/240.16
(Continued)

FOREIGN PATENT DOCUMENTS

| KR | 20060103545 A | 10/2006 |
|---|---|---|
| KR | 20060123561 A | 12/2006 |
| KR | 20070037531 A | 4/2007 |

OTHER PUBLICATIONS

International Search Report mailed Apr. 30, 2010 for PCT/KR2009/005713.

*Primary Examiner* — Dave Czekaj
*Assistant Examiner* — Kehinde O Abimbola
(74) *Attorney, Agent, or Firm* — Hauptman Ham, LLP

(57) ABSTRACT

A video decoding method using an inter prediction, includes: reconstructing a first differential motion vector and a second differential motion vector of a current block by decoding encoded data; deriving a first predicted motion vector and a second predicted motion vector of the current block from one or more neighboring blocks of the current block; generating a first motion vector of the current block by adding the first candidate motion vector to the first differential motion vector, and a second motion vector of the current block by adding the second candidate motion vector (Continued)

to the second differential motion vector; generating a predicted block of the current block by using the first and second motion vectors; reconstructing a residual block by decoding residual signals included in the encoded data; and adding each pixel value of the predicted block to a corresponding pixel value of the residual block.

14 Claims, 9 Drawing Sheets

(51) Int. Cl.
    *H04N 19/52* (2014.01)
    *H04N 19/567* (2014.01)
    *H04N 19/124* (2014.01)
    *H04N 19/46* (2014.01)
    *H04N 19/61* (2014.01)

(52) U.S. Cl.
    CPC ........... *H04N 19/567* (2014.11); *H04N 19/46* (2014.11); *H04N 19/61* (2014.11)

(58) Field of Classification Search
    CPC .. H04N 19/176; H04N 19/137; H04N 19/159; G06T 5/001; G06T 9/001
    See application file for complete search history.

(56) References Cited

U.S. PATENT DOCUMENTS

| | | | |
|---|---|---|---|
| 7,876,830 B2 * | 1/2011 | Katayama | H04N 19/61 375/240.12 |
| 8,005,142 B2 | 8/2011 | Kim et al. | |
| 8,064,520 B2 * | 11/2011 | Mukerjee | H04N 19/105 375/240.15 |
| 8,139,875 B2 * | 3/2012 | Sekiguchi | H04N 19/176 382/166 |
| 8,144,771 B2 | 3/2012 | Kim et al. | |
| 8,340,184 B2 | 12/2012 | Nakagawa et al. | |
| 8,379,722 B2 | 2/2013 | Tourapis et al. | |
| 8,406,301 B2 | 3/2013 | Boyce | |
| 8,891,634 B2 * | 11/2014 | Sun | H04N 19/51 375/240.29 |
| 2004/0008786 A1 | 1/2004 | Boyce | |
| 2005/0041740 A1 * | 2/2005 | Sekiguchi | H04N 19/139 375/240.16 |
| 2005/0053292 A1 * | 3/2005 | Mukerjee | H04N 19/105 382/236 |
| 2005/0053297 A1 * | 3/2005 | Mukerjee | H04N 19/105 382/236 |
| 2005/0053298 A1 * | 3/2005 | Mukerjee | H04N 19/105 382/236 |
| 2005/0053300 A1 * | 3/2005 | Mukerjee | H04N 19/105 382/239 |
| 2006/0002474 A1 | 1/2006 | Au et al. | |
| 2006/0146191 A1 | 7/2006 | Kim et al. | |
| 2006/0209960 A1 * | 9/2006 | Katayama | H04N 19/61 375/240.16 |
| 2006/0280253 A1 | 12/2006 | Tourapis et al. | |
| 2007/0036226 A1 | 2/2007 | Kim et al. | |
| 2007/0098077 A1 * | 5/2007 | Sun | H04N 19/51 375/240.18 |
| 2007/0111773 A1 | 5/2007 | Gururajan et al. | |
| 2007/0153902 A1 | 7/2007 | Nakagawa et al. | |
| 2009/0003441 A1 * | 1/2009 | Sekiguchi | H04N 19/176 375/240.13 |
| 2009/0046776 A1 | 2/2009 | Au et al. | |
| 2009/0180538 A1 | 7/2009 | Visharam et al. | |

* cited by examiner

_(1)_

METHOD AND APPARATUS FOR ENCODING/DECODING THE MOTION VECTORS OF A PLURALITY OF REFERENCE PICTURES, AND APPARATUS AND METHOD FOR IMAGE ENCODING/DECODING USING SAME

CROSS-REFERENCE TO RELATED APPLICATIONS

The present application is a continuation of U.S. patent application Ser. No. 13/124,070 filed Apr. 13, 2011, which is a the National Phase application of International Application No. PCT/KR2009/005713, filed Oct. 7, 2009, which is based upon and claims the benefit of priority from Korean Patent Application No. 10-2008-0100553, filed on Oct. 14, 2008. The disclosures of the above-listed applications are hereby incorporated by reference herein in their entirety.

TECHNICAL FIELD

The present disclosure relates to a method and an apparatus for encoding/decoding motion vectors of a plurality of reference pictures. More particularly, the present disclosure relates to a method for encoding and decoding motion vectors of a plurality of reference pictures in encoding and decoding an image.

BACKGROUND ART

The statements in this section merely provide background information related to the present disclosure and do not constitute the prior art.

As multimedia technologies are developed in rapid progress, demand for quality multimedia data including audio, image, and video is increased. Accordingly, for meeting the demand to transmit, store, and retrieve such multimedia data within a limited network environment, international standards are being set up for high efficiency video compression. Specifically, in case of videos, ISO/IEC JTC1/SC29 MPEG group and ITU-T VCEG group have created H.264/AVC MPEG-4 Part.10 standard, which attempts to achieve a high compression efficiency by using various prediction encoding methods such as variable block size motion estimation and compensation, intra prediction encoding, etc.

The prediction encoding is an effective method to reduce correlations in existence between data and it is widely used for compressing various types of data. Especially, because a list0 motion vector and a list1 motion vector, which are motion vectors of a current block for two reference pictures in B picture, have a high correlation with motion vectors of adjacent blocks, it is possible to first calculate a prediction value or predicted motion vector (PMV) for a motion vector of a current block by using motion vectors of adjacent blocks and then encode not the true values of the list0 motion vector and the list1 motion vector of the current block but just a differential value or differential motion vector (DMV) relative to the prediction value and thereby substantially reduce the bit quantity to improve the coding efficiency.

The inventor(s) has noted that for the purpose of effective compression in the encoding of a motion vector using such a predicted motion vector, more accurately predicted motion vectors proportionally improve the coding efficiency. Therefore, the inventor(s) has noted that a possible way of improving the efficiency of the predicted encoding is not only to involve motion vectors of the spatially adjacent blocks but also to generate a finite number of predicted motion vectors including temporally, spatially, or the motion vectors of spatio-temporally adjacent blocks or different motion vectors calculated from their combinations and use the most appropriate selection therefrom for the predicted encoding of the motion vectors.

The inventor(s) has noted that In this occasion, to correctly reconstruct the original motion vector from the prediction based encoded motion vectors, it is necessary to know which one of the finite number of the predicted motion vectors was used. The simplest motion vector prediction encoding method for the task is to additionally encode information on the correct predicted value used to perform the prediction encoding of the motion vectors. Alternatively, to reduce the bit quantity required to encode additional information for indicating such selection of the predicted motion vector, the current H.264/AVC standard uses medians of respective horizontal components and vertical components of the list0 and list1 motion vectors contained in the adjacent blocks (at left, upper, and upper right sides of the current block) as the predicted motion vectors for the predicted encoding of the motion vectors. The inventor(s) has noted that This method determines a predetermined prediction value calculating means, such as a default means of a median, commonly recognized in an image encoding apparatus and an image decoding apparatus and produces the prediction value (predicted motion vector) using the commonly recognized prediction value calculating, to thereby obviate the need for additionally encoding information on the used prediction motion vector. The inventor(s) has experienced that the known method of preparing the predefined prediction value calculating means is only as good as saving an additional information transmission about identifying a motion vector used as the predicted motion vector, but is still deficient because the predicted motion vector that is actually the used median is not the best predicted motion vector to minimally generate the bit quantity required for encoding the differential motion vector.

SUMMARY

In accordance with some embodiments of the present disclosure, a video decoding method using an inter prediction, comprises: reconstructing a first differential motion vector and a second differential motion vector of a current block by decoding encoded data; deriving a first predicted motion vector and a second predicted motion vector of the current block from one or more neighboring blocks of the current block; generating a first motion vector of the current block by adding the first candidate motion vector to the first differential motion vector, and a second motion vector of the current block by adding the second candidate motion vector to the second differential motion vector; generating a predicted block of the current block by using the first and second motion vectors; reconstructing a residual block by decoding residual signals included in the encoded data; and adding each pixel value of the predicted block to a corresponding pixel value of the residual block. Further, the reconstruction of the residual block comprises: identifying one or more conditions for enabling an inverse quantization and an inverse transform; and reconstructing the residual block by selecting one of the following processes according to the one or more identified conditions: skipping both of the inverse quantization and the inverse transform for the decoded residual signals, inversely quantizing the decoded residual signals and skipping the inverse transform for the inversely quantized residual signals, and inversely quantizing the decoded residual signals and inversely transforming the inversely quantized residual signals.

In accordance with some embodiments of the present disclosure, a video decoding apparatus using an inter prediction, comprises an information extractor, a predictor, a decoder, and an adder. The information extractor is configured to reconstruct a first differential motion vector and a second differential motion vector of a current block by decoding encoded data. The predictor is configured to derive a first predicted motion vector and a second predicted motion vector of the current block from one or more neighboring blocks of the current block, generate a first motion vector of the current block by adding the first candidate motion vector to the first differential motion vector, and a second motion vector of the current block by adding the second candidate motion vector to the second differential motion vector, and generate a predicted block of the current block by using the first and second motion vectors. The decoder is configured to reconstruct a residual block by decoding residual signals included in the encoded data. And the adder configured to add each pixel value of the predicted block to a corresponding pixel value of the residual block. The decoder is further is configured to identify one or more conditions for enabling an inverse quantization and an inverse transform; and reconstruct the residual block by selecting one of the following processes according to the one or more identified conditions: (i) skipping both of the inverse quantization and the inverse transform for the decoded residual signals, (ii) inversely quantizing the decoded residual signals and skipping the inverse transform for the inversely quantized residual signals, and (iii) inversely quantizing the decoded residual signals and inversely transforming the inversely quantized residual signals.

DETAILED DESCRIPTION

Figure 1:
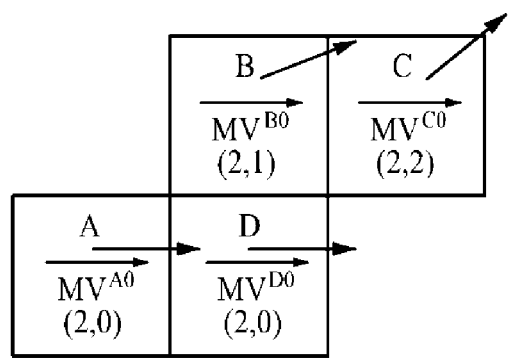
FIG. 1 is an exemplary diagram showing blocks for encoding list0 motion vectors to be encoded according to an aspect.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Some embodiments of the present disclosure provide to more accurately predict a predicted motion vector of the current motion vector for multiple reference pictures and reduce the bit quantity required for encoding of motion vectors, so as to improve the compression efficiency.

FIG. 1 is an exemplary diagram showing blocks for encoding list0 current motion vectors according to an aspect.

All blocks shown in FIG. 1 correspond to blocks which refer to a reference picture having a reference picture identifier of list0. In FIG. 1, block D is a current block having a current motion vector (MV), which is a motion vector to be currently encoded, and blocks A, B, and C are "adjacent blocks" with respect to block D.

Referring to FIG. 1, $MV^{A0}$, $MV^{B0}$, $MV^{C0}$, and $MV^{D0}$ are motion vectors (each of which will be hereinafter referred to as a "list0 motion vector") referring to the list0 reference picture, which are contained in blocks A, B, C, and D, respectively, and they are respectively defined as having horizontal components ($MV^{A0}_x$, $MV^{B0}_x$, $MV^{C0}_x$, and $MV^{D0}_x$) and vertical components ($MV^{A0}_y$, $MV^{B0}_y$, $MV^{C0}_y$, and $MV^{D0}_y$). As used herein, the list0 motion vector $MV^{D0}$ of the current block, block D, is called "list0 current motion vector". It is assumed that the list0 current motion vector $MV^{D0}$ is (2, 0), and the adjacent blocks' motion vectors $MV^{A0}$, $MV^{B0}$, and $MV^{C0}$ are respectively (2, 0), (2, 1), and (2, 2).

A list0 predicted motion vector $PMV^{D0}$ for the current motion vector of current block D is calculated as in Equation 1 defined below, and the list0 predicted motion vector $PMV^{D0}$ is defined as having a horizontal component $PMV^{D0}_x$ and a vertical component $PMV^{D0}_y$.

$$PMV^{D0} = \begin{bmatrix} PMV^{D0}_x \\ PMV^{D0}_y \end{bmatrix} = \begin{bmatrix} F(MV^{A0}_x, MV^{B0}_x, MV^{C0}_x) \\ F(MV^{A0}_y, MV^{B0}_y, MV^{C0}_y) \end{bmatrix} \quad \text{Equation 1}$$

Reviewing Equation 1, it can be seen that the list0 predicted motion vector $PMV^{D0}$ for the list0 current motion vector can be calculated using a particular function F( ), wherein list0 motion vectors $MV^{A0}$, $MV^{B0}$, and $MV^{C0}$ of adjacent blocks A, B, and C are used as variables of the particular function F( ).

Figure 2:
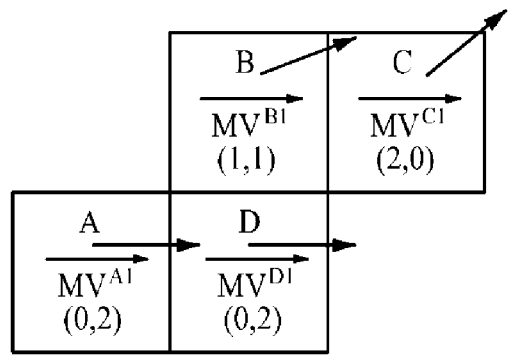
FIG. 2 is an exemplary diagram showing blocks for encoding list1 motion vectors to be encoded according to an aspect.

FIG. 2 is an exemplary diagram showing blocks for encoding list1 current motion vectors according to an aspect.

All blocks shown in FIG. 2 correspond to blocks which refer to a reference picture having a reference picture identifier of list1. In FIG. 2, block D is a current block having a current motion vector, which is a motion vector to be currently encoded, and is assumed to be the same block as block D shown in FIG. 1. Blocks A, B, and C are adjacent blocks with respect to block D, and are assumed to be the same blocks as blocks A, B, and C shown in FIG. 1.

Referring to FIG. 2, $MV^{A1}$, $MV^{B1}$, $MV^{C1}$, and $MV^{D1}$ are list1 motion vectors contained in blocks A, B, C, and D, respectively. Further, they are defined as having horizontal components ($MV^{A1}_x$, $MV^{B1}_x$, $MV^{C1}_x$, and $MV^{D1}_x$) and vertical components ($MV^{A1}_y$, $MV^{B1}_y$, $MV^{C1}_y$, and $MV^{D1}_y$), respectively. As used herein, the list1 motion vector $MV^{D1}$ of the current block, block D, is called "list1 current motion vector". As shown in FIG. 2, it is assumed that the list1 current motion vector $MV^{D1}$ is (0, 2), and the list1 motion vectors $MV^{A1}$, $MV^{B1}$, and $MV^{C1}$ of the adjacent blocks' are respectively (0, 2), (1, 1), and (2, 0). A predicted motion vector for the list1 current motion vector of the current block D is called "list1 predicted motion vector $PMV^{D1}$". The list1 predicted motion vector is calculated as in Equation 2 defined below, and is defined as having a horizontal component $PMV^{D1}_x$ and a vertical component $PMV^{D1}_y$.

$$PMV^{D1} = \begin{bmatrix} PMV^{D1}_x \\ PMV^{D1}_y \end{bmatrix} = \begin{bmatrix} F(MV^{A1}_x, MV^{B1}_x, MV^{C1}_x) \\ F(MV^{A1}_y, MV^{B1}_y, MV^{C1}_y) \end{bmatrix} \quad \text{Equation 2}$$

Reviewing Equation 2, it is noted that the list1 predicted motion vector $PMV^{D1}$ for the list1 current motion vector can be calculated with list1 motion vectors $MV^{A1}$, $MV^{B1}$, and $MV^{C1}$ of adjacent blocks A, B, and C used as variables of a particular function F( ).

In H.264/AVC standard, the list0 predicted motion vector for the list0 current motion vector and the list1 predicted motion vector for the list1 current motion vector are calculated with a function for calculating a median used as the particular function (F( )). In other words, the list0 predicted motion vector $PMV^{D0}$ for the list0 current motion vector is obtained as the median of the motion vectors $MV^{A0}$, $MV^{B0}$, and $MV^{C0}$ of the adjacent blocks A, B, and C, and the list1 predicted motion vector $PMV^{D1}$ for the list1 current motion vector is obtained as the median of the motion vectors $MV^{A1}$, $MV^{B1}$, and $MV^{C1}$ of the adjacent blocks A, B, and C. The list0 predicted motion vector $PMV^{D0}$ for the list0 current motion vector $MV^{D0}$ is expressed as Equation 3 below, and the list1 predicted motion vector $PMV^{D1}$ for the list1 current motion vector $MV^{D1}$ is expressed as Equation 4 below.

$$PMV^{D0} = \begin{bmatrix} PMV^{D0}_x \\ PMV^{D0}_y \end{bmatrix} = \begin{bmatrix} \text{median}(MV^{A0}_x, MV^{B0}_x, MV^{C0}_x) \\ \text{median}(MV^{A0}_y, MV^{B0}_y, MV^{C0}_y) \end{bmatrix} \quad \text{Equation 3}$$

$$PMV^{D1} = \begin{bmatrix} PMV^{D1}_x \\ PMV^{D1}_y \end{bmatrix} = \begin{bmatrix} \text{median}(MV^{A1}_x, MV^{B1}_x, MV^{C1}_x) \\ \text{median}(MV^{A1}_y, MV^{B1}_y, MV^{C1}_y) \end{bmatrix} \quad \text{Equation 4}$$

The list0 predicted motion vector $PMV^{D0}$ of the list0 current motion vector $MV^{D0}$ is obtained by using Equation 1 (or Equation 3), and the list1 predicted motion vector $PMV^{D1}$ of the list1 current motion vector $MV^{D1}$ is obtained by using Equation 2 (or Equation 4). Then, Equation 5 may be used to obtain a list0 differential motion vector $DMV^{D0}$ (also called "list0 motion vector residual signal") generated by subtracting the list0 predicted motion vector $PMV^{D0}$ from the list0 current motion vector $MV^{D0}$ desired to be compressed. Also, Equation 6 may be used to obtain a list1 differential motion vector $DMV^{D1}$ (also called "list1 motion vector residual signal") generated by subtracting the list1 predicted motion vector $PMV^{D1}$ from the list1 current motion vector $MV^{D1}$ desired to be compressed. The list0 differential motion vector $DMV^{D0}$ and the list1 differential motion vector $DMV^{D1}$ are then encoded by a predefined method such as an entropy encoding for transmission.

$$DMV^{D0} = MV^{D0} - PMV^{D0} = \begin{bmatrix} MV^{D0}_x - PMV^{D0}_x \\ MV^{D0}_y - PMV^{D0}_y \end{bmatrix} \quad \text{Equation 5}$$

$$DMV^{D1} = MV^{D1} - PMV^{D1} = \begin{bmatrix} MV^{D1}_x - PMV^{D1}_x \\ MV^{D1}_y - PMV^{D1}_y \end{bmatrix} \quad \text{Equation 6}$$

As illustrated in FIGS. 1 and 2, if the list0 current motion vector $MV^{D0}$ is valued (2, 0) and if Equation 3 is used to calculate the median as the list0 predicted motion vector $PMV^{D0}$, its list0 predicted motion vector $PMV^{D0}$ becomes (2, 1). Further, if the list1 current motion vector $MV^{D1}$ is valued (0, 2) and if Equation 4 is used to calculate the median as the list1 predicted motion vector $PMV^{D1}$, its list1 predicted motion vector $PMV^{D1}$ becomes (1, 1).

Such a known vector encoding method using a median as the list0 predicted motion vector or the list1 predicted motion vector allows the encoding apparatus and decoding apparatus to previously agree upon using the median for calculation of the predicted motion vector, so as to obviate the existing need to encode and transmit "additional information" on the identification of motion vectors used as the list0 predicted motion vector of the list0 current motion vector and the list1 predicted motion vector of the list1 current motion vector, and hence improves the encoding efficiency, that is, the compression efficiency.

However, as noted above, the list0 predicted motion vector $PMV^{D0}$ calculated by using the median may differ from the original list0 current motion vector $MV^{D0}$, and the list1 predicted motion vector $PMV^{D1}$ calculated by using the median may differ from the original list1 current motion vector $MV^{D1}$. It is noted from the examples of FIGS. 1 and 2 that the list0 predicted motion vector $PMV^{D0}$ (2, 1) calculated by using the median is different from the list0 current motion vector $MV^{D0}$ of (2, 0), and an attempt to use Equation 5 for list0 differential motion vector $DMV^{D0}$ will yield a list0 differential motion vector to be encoded of $DMV^{D0}$ that is (0, −1). Also, it is noted that the list1 predicted motion vector $PMV^{D1}$ (1, 1) calculated by using the median is different from the list1 current motion vector $MV^{D1}$ of (0, 2), and an attempt to use Equation 6 for list1 differential motion vector $DMV^{D1}$ will yield a list1 differential motion vector to be encoded of $DMV^{D1}$ that is (−1, 1).

Instead, if the block A's list0 motion vector $MV^{A0}$ of (2, 0) is used as the list0 predicted motion vector $PMV^{D0}$, there is no difference occurring with respect to the original list0 current motion vector $MV^{D0}$ of (2, 0), and executing Equation 5 for the list0 differential motion vector $DMV^{D0}$ will yield a list0 differential motion vector $DMV^{D0}$ to be encoded that is (0, 0). If the block A's list1 motion vector $MV^{A1}$ of (0, 2) is used as the list1 predicted motion vector $PMV^{D1}$ of (0, 2), there is no difference occurring with respect to the original list1 current motion vector $MV^{D1}$ of (0, 2), and executing Equation 6 for the list1 differential motion vector $DMV^{D1}$ will yield a list1 differential motion vector $DMV^{D1}$ to be encoded that is (0, 0).

In other words, compared with using the median to have the list0 predicted motion vector $PMV^{D0}$ calculated as (2, 1), applying the block A's list0 motion vector $MV^{A0}$ of (2, 0) as the list0 predicted motion vector $PMV^{D0}$ to have the list0 differential motion vector $DMV^{D0}$ of (0, 0) can effectively reduce the bit quantity needed to encode the same. Also, compared with using the median to have the list1 predicted motion vector $PMV^{D1}$ calculated as (1, 1), applying the block A's list1 motion vector $MV^{A1}$ of (0, 2) as the list1 predicted motion vector $PMV^{D1}$ to have the list1 differential motion vector $DMV^{D1}$ of (0, 0) can effectively reduce the bit quantity needed to encode the same.

However, in the known motion vector encoding method using the median, it is required to always use the median for calculation of the list0 predicted motion vector $PMV^{D0}$ of the list0 current motion vector $MV^{D0}$, which makes it impossible to adopt the block A's list0 motion vector $MV^{A0}$ for use as the list0 predicted motion vector $PMV^{D0}$. Moreover, it is required to always use the median for calculation of the list1 predicted motion vector $PMV^{D1}$ of the list1 current motion vector $MV^{D1}$, which makes it impossible to adopt the block A's list1 motion vector $MV^{A1}$ for use as the list1 predicted motion vector $PMV^{D1}$.

Even when the block A's list0 motion vector $MV^{A0}$ is used as the list0 predicted motion vector $PMV^{D0}$, it is necessary to prepare and deliver "extra information" on which list0 motion vector among $MV^{A0}$, $MV^{B0}$, and $MV^{C0}$ is used as the list0 predicted motion vector $PMV^{D0}$. Also, even when the block A's list1 motion vector $MV^{A1}$ is used as the list1 predicted motion vector $PMV^{D1}$, it is necessary to prepare and deliver "extra information" on which list1 motion vector among $MV^{A1}$, $MV^{B1}$, and $MV^{C1}$ is used as the list1 predicted motion vector $PMV^{D1}$. Accordingly, the encoding of the extra information counteracts the efforts to secure a better compression efficiency.

In view of this, a motion vector encoding method for multiple reference pictures according to an aspect of the present disclosure enables a more exact selection of a predicted motion vector for multiple reference pictures, so as to enable the use of a more exactly predicted motion vector in the motion vector encoding. Further, a motion vector encoding method for multiple reference pictures according to an aspect of the present disclosure not only achieves an improvement of the encoding efficiency through a more exact selection of a predicted motion vector, but can also remove the inefficiency of transmitting extra information in order to notify a predicted motion vector for multiple selected reference pictures.

Hereinafter, a more detailed description on embodiments of the present disclosure will be given by using blocks A, B, C, D shown in FIG. 1 and their respective list0 motion vectors $MV^{A0}$, $MV^{B0}$, $MV^{C0}$, and $MV^{D0}$, and blocks A, B, C, D shown in FIG. 2 and their respective list1 motion vectors $MV^{A1}$, $MV^{B1}$, $MV^{C1}$, and $MV^{D1}$.

Although the list0 motion vectors $MV^{A0}$, $MV^{B0}$, $MV^{C0}$, and $MV^{D0}$ and the list1 motion vectors $MV^{A1}$, $MV^{B1}$, $MV^{C1}$, and $MV^{D1}$ are conveniently depicted as 2-dimensional vectors with their vertical and horizontal components in FIGS. 1 and 2, it is not self-limiting and just for convenience of description. Specifically, the motion vector encoding/decoding of the disclosure is readily applicable to n-dimensional motion vectors. In addition, the depiction of FIGS. 1 and 2 uses only three spatially adjacent blocks A, B, and C with respect to the current block at D although there may be one or more temporally or spatially adjacent blocks in their places within the disclosure.

Further, in FIGS. 1 and 2, although the motion vectors for the reference picture include the list0 motion vectors $MV^{A0}$, $MV^{B0}$, $MV^{C0}$, and $MV^{D0}$ and the list1 motion vectors $MV^{A1}$, $MV^{B1}$, $MV^{C1}$, and $MV^{D1}$. However, since B picture has either one or both of list0 and list1 reference pictures, all of the motion vectors for the two reference pictures of list0 and list1 are not always indispensable. Moreover, B picture may have more than two reference pictures. In this occasion, the reference pictures can be expressed as list0, list1, . . . , list#n reference pictures, and their motion pictures can be expressed as list0, list1, . . . , list#n motion vectors.

In accordance with an aspect, the motion vector prediction modes include a predictability mode and an unpredictability mode. The predictability mode refers to a mode to indicate that a motion vector encoding apparatus or an image encoding apparatus can predict a predicted motion vector (optimum motion vector) determined for a current motion vector, which is a motion vector of the current block, according to the predetermined criteria or method in the motion vector encoding apparatus or image encoding apparatus. The unpredictability mode refers to a mode to indicate that the motion vector encoding apparatus or image encoding apparatus cannot predict the optimum motion vector.

As used herein, the optimum motion vector is just to name the current vector's predicted motion vector obtained following the predetermined criteria or method in the motion vector encoding apparatus, and it is not to say the so obtained predicted motion vector has an always optimum predicted value. Further, default motion vectors refer to list0 and list1 predicted motion vectors generated according to a criteria or method (for example, median calculation method), which is commonly preset or predetermined in the motion vector encoding apparatus or image encoding apparatus and the motion vector decoding apparatus or image decoding apparatus.

Figure 3:
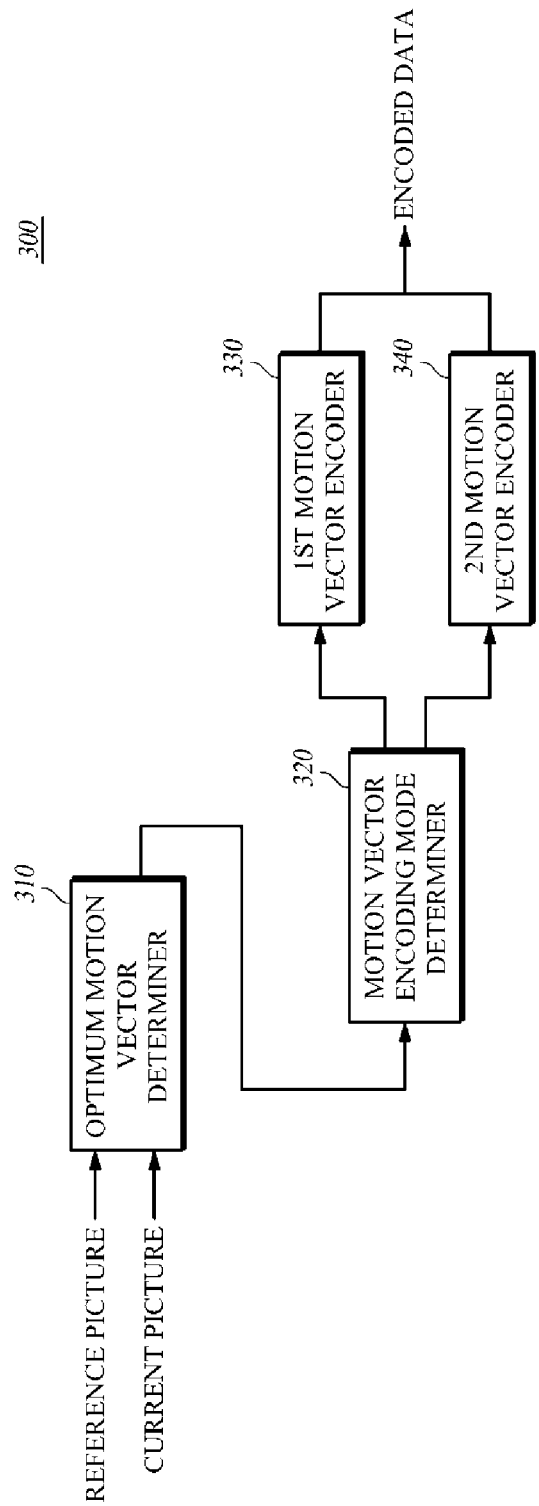
FIG. 3 is a block diagram showing a motion vector encoding apparatus according to an aspect.

FIG. 3 is a block diagram showing a motion vector encoding apparatus according to an aspect.

Referring to FIG. 3, the motion vector encoding apparatus 300 according to an aspect includes an optimum motion vector determiner 310, a motion vector encoding mode determiner 320, a first motion vector encoder 330, and a second motion vector encoder 340.

The optimum motion vector determiner 310 determines an optimum motion vector for a plurality of reference pictures of a current motion vector of a current block. That is, the optimum motion vector determiner 310 defines a set or sets of candidate motion vectors selectable as list0 and list1 optimum motion vectors from list0 and list1 current motion vectors of the current block, and determines one candidate motion vector selected from the defined list0 and list1 candidate motion vectors as list0 and list1 optimum motion vectors, respectively. The set of list0 and list1 candidate motion vectors may include one or more candidate motion vectors.

Here, the optimum motion vector determiner 310 may either separately define a candidate motion vector set for the list0 optimum motion vector and a candidate motion vector set for the list1 optimum motion vector or define a common (shared) candidate motion vector set for the list0 optimum motion vector and the list1 optimum motion vector. In the case of separately defining a candidate motion vector set for the list0 optimum motion vector and a candidate motion vector set for the list1 optimum motion vector, the optimum motion vector determiner 310 selects the candidate motion vector set for the list0 optimum motion vector from candidate motion vectors referring to the list0 reference picture when selecting the list0 optimum motion vector, and selects the candidate motion vector set for the list1 optimum motion vector from candidate motion vectors referring to the list1 reference picture when selecting the list1 optimum motion vector.

In the case of defining a common candidate motion vector set for the list0 optimum motion vector and the list1 optimum motion vector, the optimum motion vector determiner 310 properly scales candidate motion vectors referring to the list1 reference picture among the common candidate motion vectors (including candidate motion vectors for the list0 optimum motion vector and candidate motion vectors for the list1 optimum motion vector) shared when selecting the list0 optimum motion vector in consideration of the temporal distance and selects the properly scaled candidate motion vectors as candidate motion vectors for the list0 optimum motion vector, and properly scales candidate motion vectors referring to the list0 reference picture among the common candidate motion vectors shared when selecting the list1 optimum motion vector in consideration of the temporal distance and selects the properly scaled candidate motion vectors as candidate motion vectors for the list1 optimum motion vector.

Further, the optimum motion vector determiner 310 may scan one or more adjacent blocks for the current block, calculate and collect list0 and list1 motion vectors of the scanned adjacent blocks, and select the collected list0 and list1 motion vectors as a candidate motion vector set. Referring to FIGS. 1 and 2, the candidate motion vector set may be $\{MV^A, MV^B, MV^C\}$ consisting of motion vectors of the adjacent blocks A, B, and C positioned at left, upper, and upper right sides of the current block D.

According to the necessity or implementing method, the optimum motion vector determiner 310 may select a wider variety of motion vectors as a candidate motion vector set. For example, motion vectors of a block, which is located at the same position as that of the current block, in a reference picture previously existing on the temporal axis or motion vectors of the block located at the left upper end on the spatial axis may also be selected as the candidate motion vector set. Moreover, another motion vector selected using these motion vectors (such as an average or a median of one or more motion vectors) may also be included in the candidate motion vector set. The candidate motion vector set may be defined in various ways based on an assumption that the definition of the candidate motion vector set is previously set in a motion vector encoding apparatus and a motion vector decoding apparatus. When a part of all of the candidate motion vectors in the candidate motion vector set have the same value, only candidate motion vectors having different values may be selected.

The optimum motion vector determiner 310 selects one candidate motion vector from the candidate motion vector set determined by various methods, and determines the selected candidate motion vector as the list0 or list1 optimum motion vector. The optimum motion vector determiner 310 calculates selection function values for each of the candidate motion vectors by using a selection function preset in a motion vector encoding apparatus and a motion vector decoding apparatus, and determines one of the candidate motion vectors as the list0 or list1 optimum motion vector based on the calculated selection function values.

For example, the selection function value described above may include one or more combinations of a bit quantity required for encoding list0 and list1 differential motion vectors of the one or more respective candidate motion vectors included in the determined candidate motion vector set against the list0 and list1 current motion vectors, the magnitude of the list0 and list1 differential motion vectors of the one or more respective candidate motion vectors included in the determined candidate motion vector set against the list0 and list1 current motion vectors, and a bit quantity required to encode the motion vector prediction mode. With the bit quantity of the differential vector used as the selection function value, the optimum motion vector determiner 310 may calculate the bit quantity required to encode the list0 and list1 differential motion vectors for each of the one or more candidate motion vectors in the determined candidate motion vector set, and select the candidate motion vector having the least or minimum of the calculated bit quantity as the list0 or list1 optimum motion vector.

As an alternative example, the optimum motion vector determiner 310 may determine the list0 or list1 optimum motion vector by using rate-distortion optimization, which simultaneously considers the required bit rate for encoding when one motion vector is selected from the selected one or more candidate motion vectors, and the subsequent quality of the reconstructed video. At this time, the selection function value as described above may be rate-distortion cost.

As a still another example, the optimum motion vector determiner 310 may use Lagrangian cost function defined by Equations 7, 8, and 9 below as the selection function for determining the list0 and list1 optimum motion vector. At this time also, the selection function value as described above may be Lagrangian cost.

$$J^0(n,k)=D^0(n,k)+\lambda^0 \times R_M^0(n,k) \qquad \text{Equation 7}$$

$$J^1(n,k)=D^1(n,k)+\lambda^1 \times R_M^1(n,k) \qquad \text{Equation 8}$$

$$J(n,k)=J^0(n,k)+J^1(n,k)+\lambda \times R_H(n,k) \times w \qquad \text{Equation 9}$$

Here, J is Lagrangian cost, $J^0$ is Lagrangian cost for the list0 reference picture, $J^1$ is Lagrangian cost for the list1 reference picture, $D^0$ is the difference between the original image and an image reconstructed using the list0 reference picture, $D^1$ is the difference between the original image and an image reconstructed using the list1 reference picture, and $\lambda$, $\lambda^0$, and $\lambda^1$ are Lagrangian multipliers. $R_H$ is the bit quantity required to encode the motion vector prediction mode, $R_M^0$ is the bit quantity required to encode the differential vector of the list0 current motion vector, and $R_M^1$ is the bit quantity required to encode the differential vector of the list1 current motion vector.

Further, w is a weight having a value of 1 or 2 according to the implementation method. In an aspect, when respective motion vector encoding modes are determined for the list0 and list1 reference pictures, w may have a value of 2 since there are two motion vector encoding modes. In another aspect, when a single motion vector encoding mode is determined for the list0 and list1 reference pictures, w may have a value of 1 due to the single motion vector encoding mode.

In Equations 7 to 9, J, $J^0$, $J^1$, $D^0$, $D^1$, $R_H$, $R_M^0$, and $R_M^1$ are all defined by n for representing the number of the current picture where the current block is and k for representing the number of the current block. Therefore, the use of Lagrangian cost to determine the optimum motion vector may be selectively applied in units of a picture or a block. Further, during the selection of the optimum motion vector, if there is no change in the error D between the original image data and reconstructed image data or if an easier calculation is desired, out of Equations 7 and 8 calculation for Lagrangian cost J it is allowable to delete $D^0$, $D^1$, $\lambda$, $\lambda^0$, and $\lambda^1$ for simplification.

In the course of calculating Lagrangian cost, $R_H$ in Equation 9 is the bit quantity required to encode the motion vector prediction mode, $R_M^0$ and $R_M^1$ are the bit quantities required to encode the differential vector against the current motion vector, and their calculation methods change by the motion vector prediction modes. Specifically, if the motion vector prediction mode is an unpredictability mode, $R^0_M$ and $R^1_M$ may be the bit quantity required to encode list0 and list1 differential vectors corresponding to the difference between the list0 and list1 current motion vectors and list0 and list1 predicted motion vectors (hereinafter, referred to as "list0 and list1 default motion vector") generated by a predefined method such as a median calculation. In addition, if the motion vector prediction mode is a predictability mode, $R^0_M$ and $R^1_M$ may be the bit quantity required to encode list0 and list1 differential vectors corresponding to the difference between the list0 and list1 current motion vectors and the determined list0 and list1 optimum motion vectors.

Further, instead of determining the list0 and list1 optimum motion vectors using Lagrangian cost function in Equations 7 to 9 as the selection function, the optimum motion vector determiner 310 may determine the list0 and list1 optimum motion vectors by using a more generalized selection function as defined by Equations 10 and 11 below. However, Equations 10 and 11 are expressed based on an assumption that the list0 current motion vector of the current block to be encoded is the motion vector $MV^{D0}$ of the block D in FIG. 1, and the list1 current motion vector of the current block to be encoded is the motion vector $MV^{D1}$ of the block D in FIG. 2.

$$PMV^0_{enc} = \underset{PMVC \in CS}{\operatorname{argmin}} h(PMVC^0 \mid MV^{D0}) \qquad \text{Equation 10}$$

In Equation 10, $PMV^0_{enc}$ is the determined list0 optimum motion vector and $PMVC^0$ represents an element (motion vector) belonging to a set of candidate motion vectors (CS) made available to select the list0 optimum motion vector of the current motion vector $MV^{D0}$. "h( )" is a selection function for selecting the list0 optimum motion vector for the current motion vector $MV^{D0}$.

$$PMV^1_{enc} = \underset{PMVC \in CS}{\operatorname{argmin}} h(PMVC^1 \mid MV^{D1}) \qquad \text{Equation 11}$$

In Equation 11, $PMV^1_{enc}$ is the list1 optimum motion vector and $PMVC^1$ represents an element (motion vector) belonging to a set of candidate motion vectors (CS) made available to select the list1 optimum motion vector of the current motion vector $MV^{D1}$.

In Equations 10 and 11, "h( )" is a selection function for selecting the list1 optimum motion vector for the current motion vector $MV^{D1}$. An example of the selection function h( ) for use may be either the bit quantity required to perform the difference operation on the list0 and list1 current motion vectors and encode the result or the sum of the required bit quantity for the difference operation of the list0 and list1 current motion vectors and encoding its result and the required bit quantity for encoding the motion vector prediction mode. In addition, for the sake of a simplified calculation, the actually required bit quantity may be replaced by the size of list0 and list1 differential vectors, i.e. the difference between the list0 and list1 current motion vector and the list0 and list1 optimum motion vector. More generally, assuming both an encoding apparatus and a decoding apparatus have prior knowledge of the definition of the selection function h( ), it can be variably defined for application. With such a selection function h( ) given, it is possible to select one candidate motion vector $PMVC^0$ to optimize the selection function h( ) from the candidate motion vector set CS that includes the candidate motion vectors for the optimum motion vector, as the optimum motion vector $PMV^0_{enc}$.

The motion vector encoding mode determiner 320 determines the motion vector encoding mode according to whether the motion vector decoding apparatus can predict an optimum motion vector for multiple reference pictures. That is, the motion vector encoding mode determiner 320 determines the motion vector encoding mode as a predictability mode or an unpredictability mode according to whether the motion vector decoding apparatus can predict the optimum motion vector determined by the optimum motion vector determiner 310, and controls the first motion vector encoder 330 or the second motion vector encoder 340 to encode the list0 and list1 current motion vectors according to the determined motion vector encoding mode.

Here, the motion vector encoding mode determiner 320 calculates values of decision function for each of the candidate motion vectors by using a decision function predefined between the motion vector encoding apparatus and the motion vector decoding apparatus, determines list0 and list1 estimated optimum motion vectors for the list0 and list1 current motion vectors by selecting respective candidate motion vectors from the one or more candidate motion vectors based on the calculated values of decision function, and performs a comparison between the determined list0 and list1 estimated optimum motion vectors and the determined list0 and list1 optimum motion vectors, thereby determining if the motion vector decoding apparatus can predict the list0 and list1 optimum motion vectors.

For example, the list0 and list1 differential vectors calculated using the list0 and list1 optimum motion vectors $PMV^0_{enc}$ and $PMV^1_{enc}$, a finite number of candidate motion vectors available to become the candidates for the predicted motion vector, reference picture data for use in the motion compensation, previously reconstructed adjacent block information, and a residual signal corresponding to the difference against the predicted pixel value of a predicted block generated by motion-compensating the pixel value of the current block can be used to determine whether the motion vector decoding apparatus can predict the list0 and list1 optimum motion vectors.

To this end, the motion vector encoding mode determiner 320 determines an estimated optimum motion vector $PMV^0_{dec}$ by using differential vectors $DMV^{D0}$ ($=MV^{D0} - PMV^0_{enc}$) against the list0 current motion vector $MV^{D0}$ to be calculated and transmitted by the motion vector encoding apparatus 300, previously reconstructed adjacent block information, reference picture data for use in motion compensating, and a decision function as defined by Equation 12 below, and determines an estimated optimum motion vector $PMV^1_{dec}$ by using differential vectors $DMV^{D1}$ ($=MV^{D1} - PMV^1_{enc}$) against the list1 current motion vector $MV^{D1}$ to be transmitted, previously reconstructed adjacent block information, reference picture data for use in motion compensating, and a decision function as defined by Equation 13 below.

$$\begin{aligned} PMV^0_{dec} &= \underset{PMVC \in CS}{\operatorname{argmin}} g(PMVC^0 \mid DMV^{D0}) \\ &= \underset{PMVC \in CS}{\operatorname{argmin}} g(PMVC^0 \mid MV^{D0} - PMV^0_{enc}) \end{aligned} \qquad \text{Equation 12}$$

In Equation 12, decision function g( ) is to let the motion vector encoding mode determiner 320 of the motion vector encoding apparatus 300 determine if the motion vector encoding apparatus or the motion vector decoding apparatus could predict the list0 optimum motion vector $PMV^0_{enc}$ by using the list0 differential vector and the previously reconstructed adjacent block information. Further, the decision function g( ) may be used for determining the list0 estimated optimum motion vector in the motion vector decoding apparatus.

$$PMV^0_{dec} = \underset{PMVC \in CS}{\arg\min}\, g(PMVC^0 \mid DMV^{D0}) \qquad \text{Equation 13}$$
$$= \underset{PMVC \in CS}{\arg\min}\, g(PMVC^0 \mid MV^{D0} - PMV^0_{enc})$$

In Equation 13, decision function g( ) is to let the motion vector encoding mode determiner 320 of the motion vector encoding apparatus 300 determine if the motion vector encoding apparatus or the motion vector decoding apparatus could predict the list1 optimum motion vector $PMV^1_{enc}$ by using the list1 differential vector and the previously reconstructed adjacent block information. Further, the decision function g( ) may be used for determining the list1 estimated optimum motion vector in the motion vector decoding apparatus. The decision function g( ) may be defined in various ways based on an assumption that the motion vector encoding apparatus 300 and the motion vector decoding apparatus have prior knowledge of the definition of the decision function g( ).

By means of Equation 12, the motion vector encoding mode determiner 320 performs an advance calculation of the list0 estimated optimum motion vector $PMV^0_{dec}$ to be estimated by the motion vector decoding apparatus, and then determines if the motion vector decoding apparatus can correctly predict the list0 optimum motion vector $PMV^0_{enc}$ and obtain the correctly reconstructed video data by using the list0 differential vector $DMV^{D0}$ (=$MV^{D0}-PMV^0_{enc}$). In other words, the motion vector encoding mode determiner 320 rehearses the process of determining the list0 estimated optimum motion vector, which the image decoding apparatus will perform, and uses a result of the rehearsal, i.e. the list0 estimated optimum motion vector, in its own motion vector encoding process.

By means of Equation 13, the motion vector encoding mode determiner 320 performs an advance calculation of the list1 estimated optimum motion vector $PMV^1_{dec}$ to be estimated by the motion vector decoding apparatus, and then determines if the motion vector decoding apparatus can correctly predict the list1 optimum motion vector $PMV^1_{enc}$ and obtain the correctly reconstructed video data by using the list1 differential vector $DMV^{D1}$ (=$MV^{D1}-PMV^1_{enc}$). In other words, the motion vector encoding mode determiner 320 rehearses the process of determining the list1 estimated optimum motion vector, which the image decoding apparatus will perform, and uses a result of the rehearsal, i.e. the list1 estimated optimum motion vector, in its own motion vector encoding process.

For example, when the list0 estimated optimum motion vector $PMV^0_{dec}$ calculated using Equation 12 by the motion vector encoding mode determiner 320 is equal to the list0 optimum motion vector $PMV^0_{enc}$ determined by the optimum motion vector determiner 310, the motion vector decoding apparatus can correctly reconstruct the current motion vector $MV^{D0}$ and thus obtain the correctly reconstructed video data by adding its own estimation of the list0 estimated optimum motion vector $PMV^0_{dec}$ to the list0 differential vector $DMV^{D0}$ supplied by the motion vector encoding apparatus.

In addition, when the list1 estimated optimum motion vector MV dec calculated using Equation 13 by the motion vector encoding mode determiner 320 is equal to the list1 optimum motion vector $PMV^1_{enc}$ determined by the optimum motion vector determiner 310, the motion vector decoding apparatus can correctly reconstruct the current motion vector $MV^{D1}$ and thus obtain the correctly reconstructed video data by adding its own estimation of the list1 estimated optimum motion vector $PMV^1_{dec}$ to the list1 differential vector $DMV^{D1}$ supplied by the motion vector encoding apparatus.

Therefore, when the list0 and list1 predicted motion vectors $PMV^0_{enc}$ and $PMV^1_{enc}$ determined by the optimum motion vector determiner 310 are equal to the list0 and list1 estimated optimum motion vectors $PMV^0_{dec}$ and $PMV^1_{dec}$ estimated to be predicted by the motion vector decoding apparatus, the motion vector encoding mode determiner 320 determines that the motion vector decoding apparatus can predict the list0 and list1 predicted motion vectors $PMV^0_{enc}$ and $PMV^1_{enc}$, or else, it determines that the motion vector decoding apparatus cannot predict them.

Or, depending on aspects, even when the list0 and list1 predicted motion vectors $PMV^0_{enc}$ and $PMV^1_{enc}$ determined by the optimum motion vector determiner 310 differ by less than a predetermined vector boundary value from the list0 and list1 estimated optimum motion vectors $PMV^0_{dec}$ and $PMV^1_{dec}$ estimated to be predicted by the motion vector decoding apparatus, the motion vector encoding mode determiner 320 may determine that the motion vector decoding apparatus can predict the list0 and list1 predicted motion vectors $PMV^0_{enc}$ and $PMV^1_{enc}$, or else, it may determine that the motion vector decoding apparatus cannot predict them. The predetermined vector boundary value refers to a value that can be freely set based on the unit of the motion vector size through a calculation or experience.

According to another aspect, in a case where the video compression rate is high, video pixel values have little change, or video motion vectors are somewhat constant, even though the list0 predicted motion vector $PMV^0_{enc}$ is not equal to or differs by less than a predetermined vector boundary value from the list0 estimated optimum motion vector $PMV^0_{dec}$, when a motion compensated video data by the list0 current motion vector reconstructed using the list0 estimated optimum motion vector $PMV^0_{dec}$ (or by $MV^{D0}=DMV^{D0}+PMV^0_{dec}$) is identical with the motion compensated video data by the list0 current motion vector reconstructed using the list0 optimum motion vector $PMV^0_{enc}$ (or by $MV^{D0}=DMV^{D0}+PMV^0_{enc}$), the motion vector encoding mode determiner 320 determines that the motion vector decoding apparatus can predict the list0 predicted motion vector $PMV^0_{enc}$, or else, it determines that the motion vector decoding apparatus cannot predict the vector.

Also, even though the list1 predicted motion vector $PMV^1_{enc}$ is not equal to the list1 estimated optimum motion vector $PMV^1_{dec}$, when a motion compensated video data by the list1 current motion vector reconstructed using the list1 estimated optimum motion vector $PMV^1_{dec}$ (or by $MV^{D1}=DMV^{D1}+PMV^1_{dec}$) is identical with the motion compensated video data by the list1 current motion vector reconstructed using the list1 optimum motion vector $PMV^1_{enc}$ (or by $MV^{D1}=DMV^{D1}+PMV^1_{enc}$), for example, when the Sum of Absolute Difference (SAD) between two cases of reconstructed video data is "0", the motion vector encoding mode determiner 320 determines that the motion vector decoding apparatus can predict the list1 predicted motion vectors $PMV^1_{enc}$, or else, it determines that the motion vector decoding apparatus cannot predict the vector.

Further, depending aspects, in an effort to further drive up the compression rate, when a motion compensated video data by the list0 current motion vector reconstructed using the list0 estimated optimum motion vector $PMV^0_{dec}$ (or by $MV^{D0}=DMV^{D0}+PMV^0_{dec}$) differs by less than a predetermined data boundary value from the motion compensated video data by the list0 current motion vector reconstructed using the list0 optimum motion vector $PMV^0_{enc}$ (or by $MV^{D0}=DMV^{D0}+PMV^0_{enc}$), for example, when the SAD between two cases of reconstructed video data has a value below a predetermined threshold, the motion vector encoding mode determiner 320 determines that the motion vector decoding apparatus can predict the list0 predicted motion vector $PMV^0_{enc}$ by using the list0 estimated optimum motion vector $PMV^0_{dec}$, or else, it determines that the motion vector decoding apparatus cannot predict the vector. The predetermined data boundary value refers to a value that can be freely set based on the unit of data size, such as the bit quantity of data, through a calculation expression or experience.

Also, even though the list1 predicted motion vector $PMV^1_{enc}$ is not equal to the list1 estimated optimum motion vector $PMV^1_{dec}$, when a motion compensated video data by the list1 current motion vector reconstructed using the list1 estimated optimum motion vector $PMV^1_{dec}$ (or by $MV^{D1}=DMV^{D1}+PMV^1_{dec}$) differs by less than a (or predetermined data boundary value from the motion compensated video data by the list1 current motion vector reconstructed using the list1 optimum motion vector $PMV^1_{enc}$ (or by $MV^{D1}=DMV^{D1}+PMV^1_{enc}$), for example, when the Sum of Absolute Difference (SAD) between two cases of reconstructed video data is "0", the motion vector encoding mode determiner 320 determines that the motion vector decoding apparatus can predict the list1 predicted motion vectors $PMV^1_{enc}$ by using the list1 estimated optimum motion vector $PMV^1_{dec}$, or else, it determines that the motion vector decoding apparatus cannot predict the vector.

Various types of decision functions may be applied to the calculation of the list0 and list1 estimated optimum motion vectors based on an assumption that they are preset in the motion vector encoding apparatus 300 and the motion vector decoding apparatus. In the following description, since a preset decision function can be applied to both list0 and list1, each reference picture is not discriminated between list0 and list1.

For decision function g( ) of Equations 12 and 13 above, a function using template matching (TM) or boundary matching (BM) may be used.

As an example, in the case of applying a decision function using TM, a template matching pixel index set or template matching set (TMS) may be defined as a set of indices for representing relative positions of selected pixels with a reference to a given designated block position and they may be exemplified by one or more pixel positions adjacent to the designated block from its left side, upper left side, and upper side. Requirements will diversify the method. Generally speaking, the more pixels TMS indicates, the more accurate matching is possible leaving increased calculation amount.

The template matching method, subsequent to defining a candidate motion vector set (CS) including all candidate motion vectors selectable as an estimated optimum motion vector, calculates differences between pixels indicated by TMS for the blocks (reference blocks) designated by the respective candidate motion vectors in the defined candidate motion vector set and pixels indicated by TMS for the current block by using Equation 14 (an example of Equations 12 and 13) below to generate the matching error with respect to each of the candidate motion vectors and select the one having the least matching error as the above mentioned estimated optimum motion vector $PMV_{dec}$.

$$PMV^1_{dec} = \underset{PMVC \in CS}{\mathrm{argmin}}\, g(PMVC^1 \mid DMV^{D1}) \qquad \text{Equation 14}$$

$$g(PMVC^1 \mid DMV^{D1}) = \sum_{i \in TMS} [f(PMVC^1 + DMV^{D1}, i) - C(i)]^2$$

In Equation 14, $(PMVC^1+DMV^{D1})$ of $f(PMVC^1+DMV^{D1}, i)$ represents pixel positions indicated by neighboring index i (included in TMS) with respect to the reference block in the reference picture again indicated by index i, and $f(PMVC^1+DMV^{D1}, i)$ refers to the pixel values at the same positions. Further, C(i) indicates the neighboring pixel values of the current block indicated by i.

The decision function $g(PMVC^1|DMV^{D1})$ provides informative estimates for telling the exactness of a block reconstructed by adding a residual signal of a residual block obtained through a difference operation between the current block and a predicted block, which is predicted through motion compensation of a reference block indicated by a motion vector $PMVC^1+DMV^{D1}$, and a pixel value of the reference block indicated by the motion vector $PMVC^1+DMV^{D1}$, wherein the motion vector $PMVC^1+DMV^{D1}$ is calculated by adding a differential vector $DMV^{D1}$ provided to the motion vector decoding apparatus by the motion vector encoding apparatus 300 and a candidate motion vector $PMVC^1$, which is an element of the candidate motion vector set CS. For the purposes of the estimation, Equation 14 uses a sum of a squared error. However, different applications may invite other methods such as a sum of an absolute difference. Estimated predicted motion vector $PMV^1_{dec}$ may refer to the candidate motion vector $PMVC^1$, which minimizes the decision function $g(PMVC^1|DMV^{D1})$.

In other words, the motion vector encoding mode determiner 320 calculates differences of pixel values between pixels indicated by the set of template matching pixel indices (TMS) for the reference blocks designated by one or more respective candidate motion vectors included in the defined candidate motion vector set and pixels indicated by the template matching pixel indices for the current block, and based on the calculated pixel value differences, executes the predefined decision function to obtain the matching error for each candidate motion vector as the value of the decision function.

As another example, the decision function using boundary pixel matching or boundary matching (BM) is described. Similar to the earlier aspect of TMS, the boundary matching pixel index set or boundary matching set (BMS) may be defined as a set of indices for indicating the positions of the pixels at the current block's leftmost and uppermost areas. Of course, it may be also defined as the positions of part or all of the pixels within the current block at the block boundary depending on applications.

Upon completion of defining the entire candidate motion vector set (CS) selectable as a predicted motion vector, in order to find which candidate motion vector (PMVC) is the fittest among the candidate motion vector set (CS), the boundary pixel matching is performed to select one effective candidate motion vector (PMVC) to minimize the boundary pixel matching error from candidate motion vector set (CS), as the estimated predicted motion vector $PMV^1_{dec}$. For this purpose, the motion vector encoding mode determiner 320 can calculate the matching errors contained in the respective candidate motion vectors by using not only the sum of a squared error as in Equation 15, but also the sum of an absolute difference and other methods.

$$PMV^1_{dec} = \underset{PMVC \in CS}{\operatorname{argmin}} g(PMVC^1 \mid DMV^{D1})$$

$$g(PMVC^1 \mid DMV^{D1}) = \sum_{i \in BMS} [f(i) - C(i)]^2$$

Equation 15

In equation 15, C(i) indicates the pixel values indicated by index i within the BMS among reconstructed pixels of the current block reconstructed by adding a residual signal of a residual block obtained through a difference operation between the current block and a predicted block, which is predicted through motion compensation of a reference block indicated by a motion vector $PMVC^1 + DMV^{D1}$, and a pixel value of the reference block indicated by a motion vector $PMVC^1 + DMV^{D1}$, wherein the motion vector $PMVC^1 + DMV^{D1}$ is calculated by adding a differential vector $DMV^{D1}$ provided to the motion vector decoding apparatus by the motion vector encoding apparatus 300 and a candidate motion vector $PMVC^1$, which is an element of the candidate motion vector set CS.

In addition, f(i) indicates the value of an immediately adjacent pixel with respect to the pixel designated by the BMS's index i. Using Equation 15, boundary pixel matching errors are calculated for the respective candidate motion vectors ($PMVC^1$) in the candidate motion vector set and a selection is made for the candidate motion vector generating the least matching error, which is then determined as the estimated optimum motion vector $PMV^1_{dec}$. That is, the estimated optimum motion vector refers to a predicted motion vector to be estimated by the motion vector decoding apparatus.

In other words, the motion vector encoding mode determiner 320 may calculate matching errors for one or more respective candidate motion vectors as the values of the decision function, wherein the calculation is based on the difference between a pixel value indicated by an index within BMS out of reconstructed pixels of the current block reconstructed through adding a residual signal of a residual block generated through motion compensation using a motion vector reconstructed by using the corresponding motion vector and the differential vector and a pixel value of a reference block indicated by a corresponding candidate motion vector and a differential vector for each of one or more candidate motion vectors included in the selected candidate motion vector set, a pixel value indicated by the index of the BMS out of boundary pixels within adjacent blocks adjacent to the current block.

Further, the motion vector encoding mode determiner 320 may determine the motion vector encoding mode according to whether the motion vector decoding apparatus can predict all optimum motion vectors for multiple reference pictures. Specifically, the motion vector encoding mode determiner 320 determines a predictability mode as the motion vector encoding mode when the motion vector decoding apparatus can predict all the optimum motion vectors for multiple reference pictures, and determines an unpredictability mode as the motion vector encoding mode when the motion vector decoding apparatus cannot predict all the optimum motion vectors for multiple reference pictures.

Further, the motion vector encoding mode determiner 320 may individually determine the motion vector encoding mode for each of multiple optimum motion vectors for multiple reference pictures according to whether the motion vector decoding apparatus can predict each of the optimum motion vectors. Specifically, the motion vector encoding mode determiner 320 determines a predictability mode as the motion vector encoding mode for the optimum motion vectors, which the motion vector decoding apparatus can predict, among optimum motion vectors for multiple reference pictures, and determines an unpredictability mode as the motion vector encoding mode for the optimum motion vectors, which the motion vector decoding apparatus cannot predict, among the optimum motion vectors for multiple reference pictures.

When the motion vector encoding mode is a predictability mode, the first motion vector encoder 330 determines the optimum motion vectors for multiple reference pictures defined by the optimum motion vector determiner 310 as predicted motion vectors for the multiple reference pictures, and encodes motion information of the multiple reference pictures by using predicted motion vectors for the multiple reference pictures and the current motion vectors for the multiple reference pictures. Specifically, when the motion vector encoding mode is a predictability mode, the first motion vector encoder 330 determines the list0 and list1 optimum motion vectors as list0 and list1 predicted motion vectors for the list0 and list1 current motion vectors, and generates and encodes list0 and list1 motion information and encodes the motion vector encoding mode (i.e. the predictability mode) by using the list0 and list1 current motion vectors and the list0 and list1 optimum motion vectors.

Here, the first motion vector encoder 330 may calculate list0 and list1 difference vectors corresponding to the difference between the list0 and list1 current motion vectors and the list0 and list1 optimum motion vectors and encode the calculated list0 and list1 difference vectors, so as to encode list0 and list1 current vectors by using the list0 and list1 optimum motion vectors. That is, the first motion vector encoder 330 can generate and encode the list0 and list1 difference vectors as list0 and list1 motion information. Further to the generation and encoding of the list0 and list1 difference vectors as list0 and list1 motion information, the first motion vector encoder 330 can generate the list0 and list1 current motion vectors as list0 and list1 motion information and can encode the list0 and list1 motion information (i.e. the list0 and list1 current motion vectors) in various ways according to the characteristics (e.g. direction and size) of the list0 and list1 optimum motion vectors (for example, it can use different variable length coding tables for the encoding).

When the motion vector encoding mode is an unpredictability mode, the second motion vector encoder 340 determines default motion vectors for multiple reference pictures preset as predicted motion vectors for the multiple reference pictures, and encodes motion information on the multiple reference pictures by using predicted motion vectors for the multiple reference pictures and the current motion vectors for the multiple reference pictures. Specifically, when the motion vector encoding mode is an unpredictability mode, the second motion vector encoder 340 determines preset list0 and list1 default motion vectors as list0 and list1 predicted motion vectors for the list0 and list1 current motion vectors, and generates and encodes list0 and list1 motion information and encodes the motion vector encoding mode (i.e. the unpredictability mode) by using the list0 and list1 current motion vectors and the list0 and list1 default motion vectors.

Here, the second motion vector encoder 340 may calculate list0 and list1 difference vectors corresponding to the difference between the list0 and list1 current motion vectors and the list0 and list1 default motion vectors and encode the calculated list0 and list1 difference vectors, so as to encode the list0 and list1 current vectors by using the list0 and list1 default motion vectors. Further to the encoding of the list0 and list1 difference vectors, the second motion vector encoder 340 can encode the list0 and list1 current motion vectors in various ways according to the characteristics (e.g. direction and size) of the list0 and list1 default motion vectors (for example, it can use different variable length coding tables for the encoding).

Although the first motion vector encoder 330 and the second motion vector encoder 340 are independently implemented and shown in FIG. 3, they may be implemented by an integrated single motion vector encoder having their functions. The integrated single motion vector encoder encodes current motion vectors for the multiple reference pictures by using optimum motion vectors for multiple reference pictures and default motion vectors for the multiple reference pictures according to the motion vector encoding mode.

Figure 4:
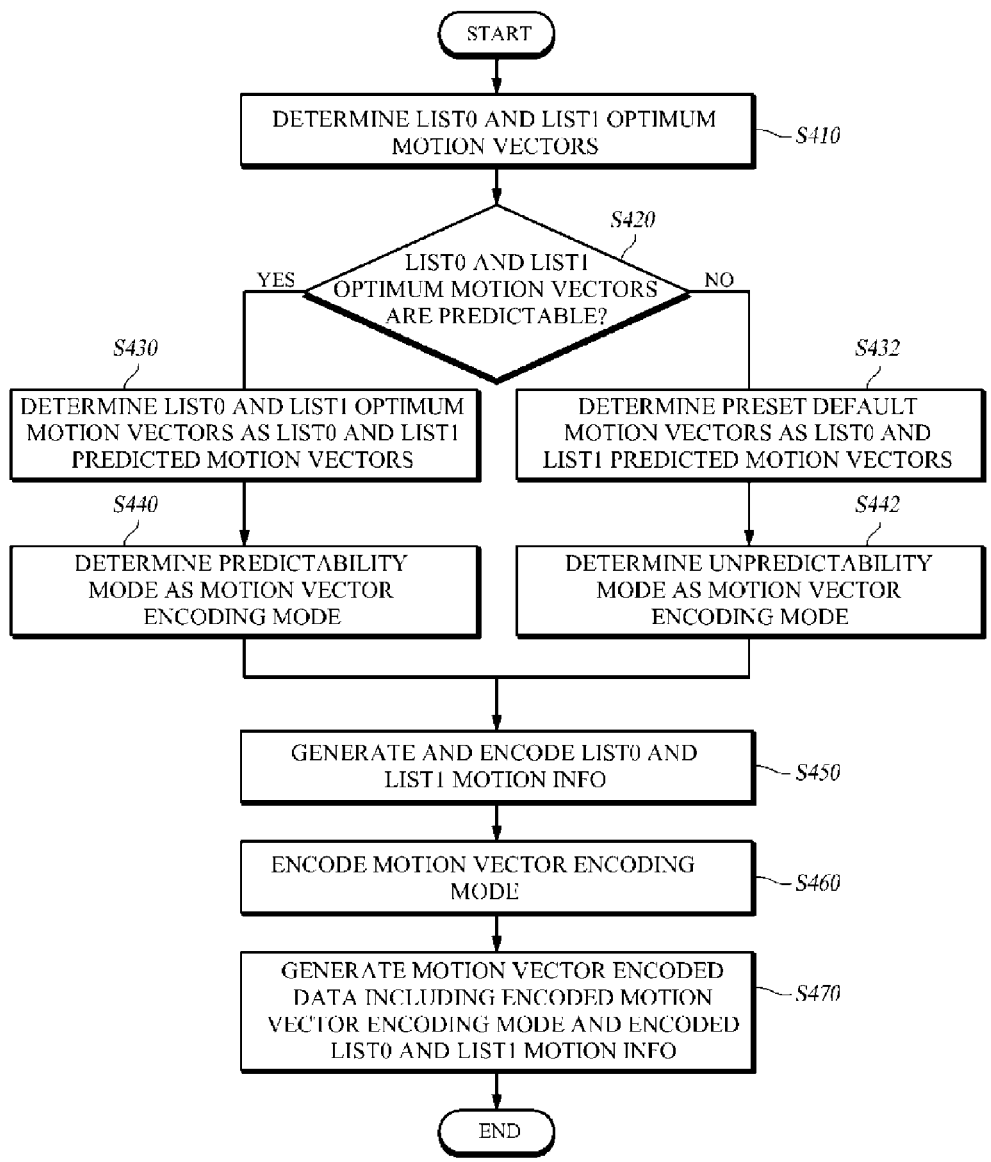
FIG. 4 is a schematic flow diagram showing a motion vector encoding method according to an aspect.

FIG. 4 is a flow diagram illustrating a motion vector encoding method according to an aspect.

In order to encode current motion vectors for multiple reference pictures, the motion vector encoding apparatus 300 determines optimum motion vectors for the multiple reference pictures (step S410). Specifically, the motion vector encoding apparatus 300 determines the list0 and list1 optimum motion vectors in order to encode the list0 and list1 current motion vectors.

After determining the optimum motion vectors for the multiple reference pictures, the motion vector encoding apparatus 300 determines whether the motion vector decoding apparatus can predict the optimum motion vectors for multiple reference pictures (step S420). When it is determined that the motion vector decoding apparatus can predict the optimum motion vectors for multiple reference pictures, the motion vector encoding apparatus 300 determines the list0 and list1 optimum motion vectors as the list0 and list1 predicted motion vectors (step S430), and determines a predictability mode as the motion vector encoding mode (step S440). When it is determined that the motion vector decoding apparatus cannot predict the optimum motion vectors for multiple reference pictures, the motion vector encoding apparatus 300 determines preset list0 and list1 predicted motion vectors as the list0 and list1 predicted motion vectors (step S432), and determines an unpredictability mode as the motion vector encoding mode (step S442). Specifically, the motion vector encoding apparatus 300 determines whether the motion vector decoding apparatus can predict the list0 and list1 optimum motion vectors. Then, when it is determined that the motion vector decoding apparatus can predict them, the motion vector encoding apparatus 300 determines a predictability mode as the motion vector encoding mode and determines the list0 and list1 optimum motion vectors as the list0 and list1 predicted motion vectors. In contrast, when it is determined that the motion vector decoding apparatus cannot predict them, the motion vector encoding apparatus 300 determines an unpredictability mode as the motion vector encoding mode and determines the list0 and list1 default motion vectors as the list0 and list1 predicted motion vectors.

After determining the predicted motion vectors for the multiple reference pictures, the motion vector encoding apparatus 300 encodes motion information on the multiple reference pictures by using the predicted motion vectors for the multiple reference pictures determined in step S430 or S432 and the current motion vectors for the multiple reference pictures (step S450). In other words, the motion vector encoding apparatus 300 generates and encodes list0 and list1 motion information by using the list0 and list1 current motion vectors and the list0 and list1 predicted motion vectors.

The motion vector encoding apparatus 300 encodes the motion vector encoding mode determined in step S440 or S442 (step S460), and generates and outputs motion vector encoded data including an encoded motion vector encoding mode and motion information on the encoded multiple reference pictures (step S470).

Meanwhile, step S410 in which the motion vector encoding apparatus 300 selects a candidate motion vector set and determines one candidate motion vector selected from the candidate motion vector set as a list0 or list1 optimum motion vector, step S420 in which the motion vector encoding apparatus 300 determines whether the motion vector decoding apparatus can predict the list0 and list1 optimum motion vectors, and step S430 in which the motion vector encoding apparatus 300 generates and encodes list0 and list1 motion information by using the list0 and list1 current motion vectors and the list0 and list1 predicted motion vectors have been already described above with reference to FIG. 3 and will not be described in more detail.

As described above, the motion vector encoded data can be decoded by a motion vector decoding apparatus as described below.

Figure 5:
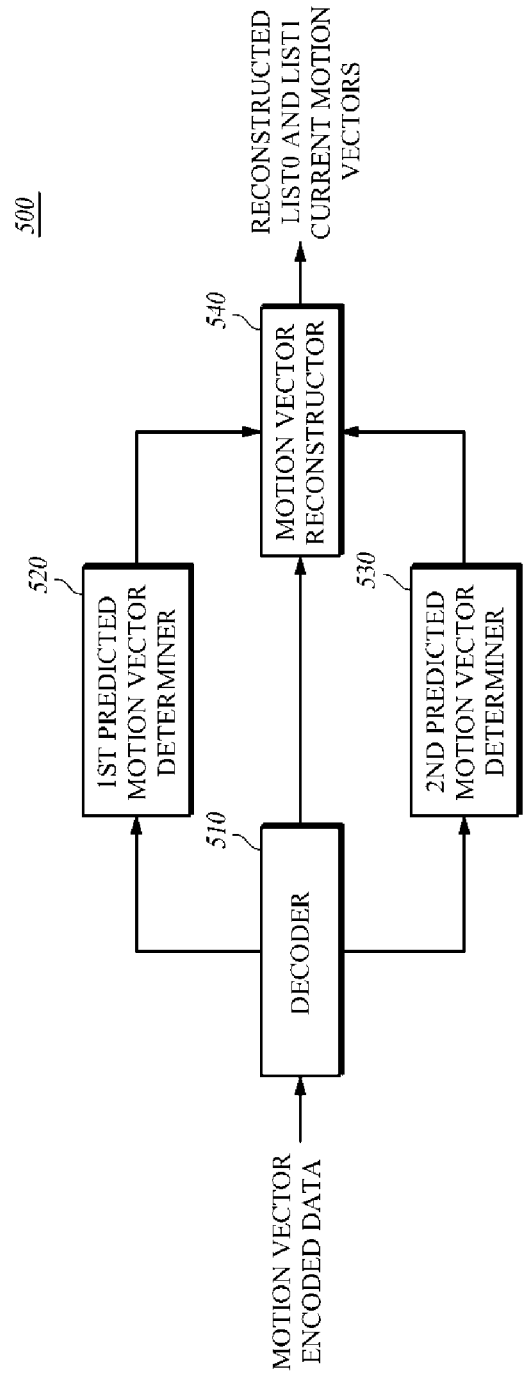
FIG. 5 is a block diagram showing a motion vector decoding apparatus according to an aspect.

FIG. 5 is a block diagram schematically illustrating the construction of a motion vector decoding apparatus according to an aspect.

A motion vector decoding apparatus 500 according to an aspect includes a decoder 510, a first predicted motion vector determiner 520, a second predicted motion vector determiner 530, and a motion vector reconstructor 540.

The decoder 510 reconstructs motion information on multiple reference pictures and an encoded motion vector encoding mode included in input motion vector encoded data. That is, the decoder 510 extracts and decodes encoded list0 and list1 motion information and the encoded motion vector encoding mode from motion vector encoded data, thereby reconstructing the motion vector encoding mode and the list0 and list1 motion information.

Further, as a result of the analysis on the reconstructed motion vector encoding mode, when the motion vector prediction mode is a predictability mode, the decoder 510 may activate the first predicted motion vector determiner 520 or may cause the first predicted motion vector determiner 520 to select list0 and list1 optimum motion vectors and determine the selected list0 and list1 optimum motion vectors as list0 and list1 predicted motion vectors. As a result of analysis on the reconstructed motion vector encoding mode, when the motion vector prediction mode is an unpredictability mode, the decoder 510 may activate the second predicted motion vector determiner 530 or may cause the second predicted motion vector determiner 530 to select list0 and list1 optimum motion vectors and determine the selected list0 and list1 optimum motion vectors as list0 and list1 predicted motion vectors.

When there is only one vector encoding mode, the decoder 510 activates or control the first predicted motion vector determiner 520 or the second predicted motion vector determiner 530 as described above. However, there may be two or more motion vector encoding modes. That is, as described above with reference to FIG. 3, there may be either multiple motion vector encoding modes for respective multiple reference pictures or a single motion vector encoding mode for multiple reference pictures.

For example, if the motion vector encoding apparatus 300 has encoded motion vector encoding modes for the list0 and list1 reference pictures, respectively, the motion vector encoded data necessarily includes motion vector encoding modes for the list0 and list1, and the decoder 510 may analyze the respective motion vector encoding modes for the list0 and list1 and activate or control the first predicted motion vector determiner 520 and the second predicted motion vector determiner 530 differently according to the respective motion vector encoding modes. In other words, if both of the motion vector encoding modes for the list0 and list1 are identically the predictability mode or the unpredictability mode, the decoder 510 may cause the first predicted motion vector determiner 520 to determine list0 and list1 estimated optimum motion vectors as the list0 and list1 predicted motion vectors or may cause the second predicted motion vector determiner 530 to determine list0 and list1 default motion vectors as the list0 and list1 predicted motion vectors. Among the motion vector encoding modes for the list0 and list1, if the motion vector encoding mode for the list0 is the predictability mode and the motion vector encoding mode for the list1 is the unpredictability mode, the decoder 510 may cause the first predicted motion vector determiner 520 to determine list0 estimated optimum motion vector as the list0 predicted motion vector and may cause the second predicted motion vector determiner 530 to determine list1 default optimum motion vector as the list1 predicted motion vector.

When the reconstructed motion vector encoding mode is a predictability mode, the first predicted motion vector determiner 520 determines estimated optimum motion vectors for multiple reference pictures, and determines the estimated optimum motion vectors for the determined multiple reference pictures as predicted motion vectors for the multiple reference pictures. When the reconstructed motion vector encoding mode is an unpredictability mode, the first predicted motion vector determiner 520 determines default motion vectors for multiple reference pictures preset as predicted motion vectors for the multiple reference pictures.

In other words, when the reconstructed motion vector encoding mode is a predictability mode, the first predicted motion vector determiner 520 selects list0 and list1 estimated optimum motion vectors and determines the selected list0 and list1 estimated optimum motion vectors as list0 and list1 predicted motion vectors. When the reconstructed motion vector encoding mode is an unpredictability mode, the first predicted motion vector determiner 520 determines list0 and list1 default motion vectors preset or generated according to preset criteria as list0 and list1 predicted motion vectors. Here, the method of determining the list0 and list1 estimated optimum motion vectors by the first predicted motion vector determiner 520 is the same as or similar to the method of determining the list0 and list1 estimated optimum motion vectors by using a decision function by the motion vector encoding apparatus 300 or the optimum motion vector determiner 310 as described above with reference to FIG. 3, so a detailed description thereof is omitted here.

Although the first predicted motion vector determiner 520 and the second predicted motion vector determiner 530 are independently constructed and shown in FIG. 5, they may be constructed as an integrated single predicted motion vector determiner having all of their functions. The integrated single predicted motion vector determiner may determine either estimated optimum motion vectors for multiple reference pictures, which are determined by predicting current motion vectors of the current block for multiple reference pictures according to the motion vector encoding mode, or default motion vectors for multiple reference pictures preset by a motion vector encoding apparatus, as predicted motion vectors for the multiple reference pictures.

The motion vector reconstructor 540 reconstructs and outputs the list0 and list1 current motion vectors by using the list0 and list1 predicted motion vectors determined by one or more combinations of the first predicted motion vector determiner 520 and the second predicted motion vector determiner 530 and the list0 and list1 motion information reconstructed by the decoder 510. When the list0 and list1 motion information is list0 and list1 differential vectors, it is possible to reconstruct the list0 and list1 current motion vectors by adding the list0 and list1 predicted motion vectors to the list0 and list1 differential vectors. However, further to this reconstruction method, the list0 and list1 current motion vectors can be reconstructed according to a method inverse to the method, by which the motion vector encoding apparatus 300 has generated the list0 and list1 motion information. In the latter case, the inverse reconstruction method may be set in the motion vector encoding apparatus 300, the first motion vector encoder 330, or the second motion vector encoder 340, and the motion vector decoding apparatus 500 or the motion vector reconstructor 540.

Figure 6:
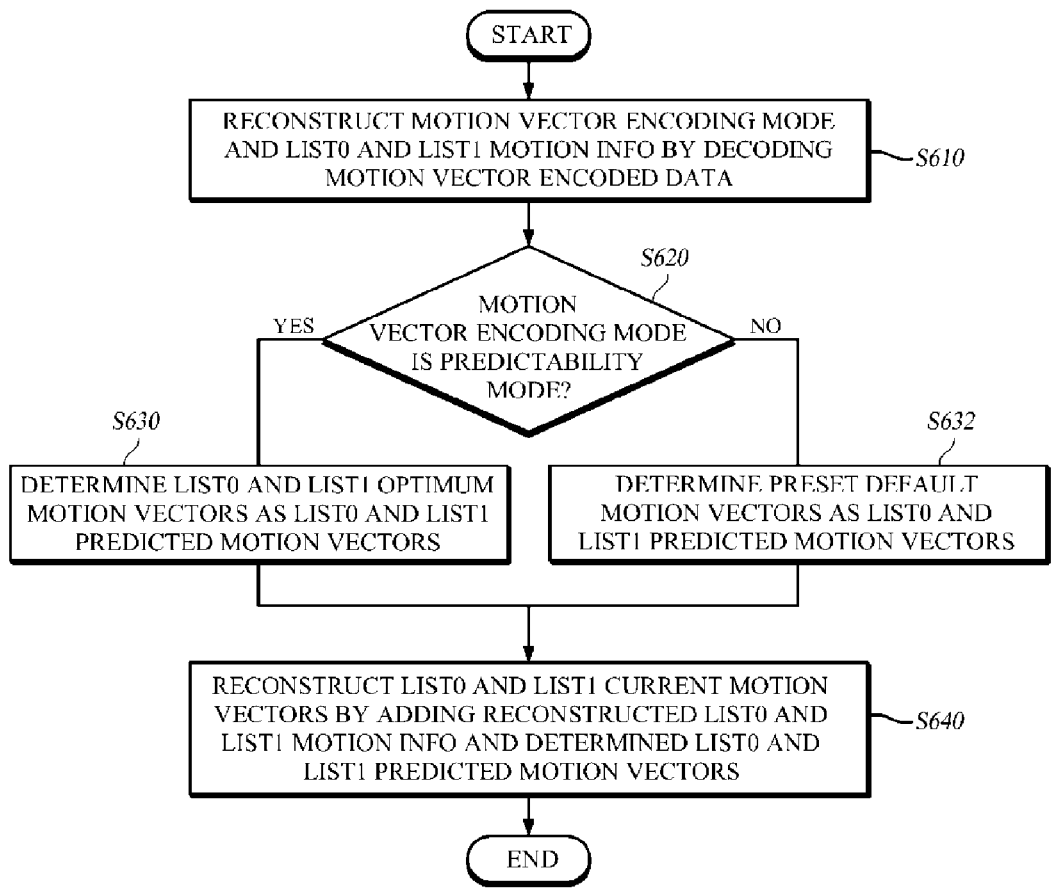
FIG. 6 is a schematic flow diagram showing a motion vector decoding method according to an aspect.

FIG. 6 is a flowchart illustrating a motion vector decoding method according to an aspect.

The motion vector decoding apparatus 500 reconstructs the motion vector encoding mode and the list0 and list1 motion information by decoding input motion vector encoded data (step S610), and determines if the motion vector prediction mode is a predictability mode (step S620). When the motion vector prediction mode is a predictability mode, the motion vector decoding apparatus 500 determines list0 and list1 estimated optimum motion vectors as the list0 and list1 predicted motion vectors (step S630). When the motion vector prediction mode is an unpredictability mode, the motion vector decoding apparatus 500 determines the list0 and list1 default motion vectors as the list0 and list1 predicted motion vectors (step S632).

By using the motion vector encoding mode reconstructed in step S610 and the list0 and list1 predicted motion vectors determined in step S630 or S632, the motion vector decoding apparatus 500 reconstructs the list0 and list1 current motion vectors (step S640).

The method of determining list0 and list1 estimated optimum motion vectors as the list0 and list1 predicted motion vectors through analysis on the motion vector encoding mode or determining the list0 and list1 default motion vectors as the list0 and list1 predicted motion vectors and the method of reconstructing the list0 and list1 current motion vectors by using the motion vector encoding mode and the list0 and list1 motion information have been already described above with reference to FIG. 5, so a detailed description thereof is omitted here.

The motion vector encoding/decoding apparatus according to an aspect described above can be employed in an image encoding apparatus and an image decoding apparatus.

Figure 7:
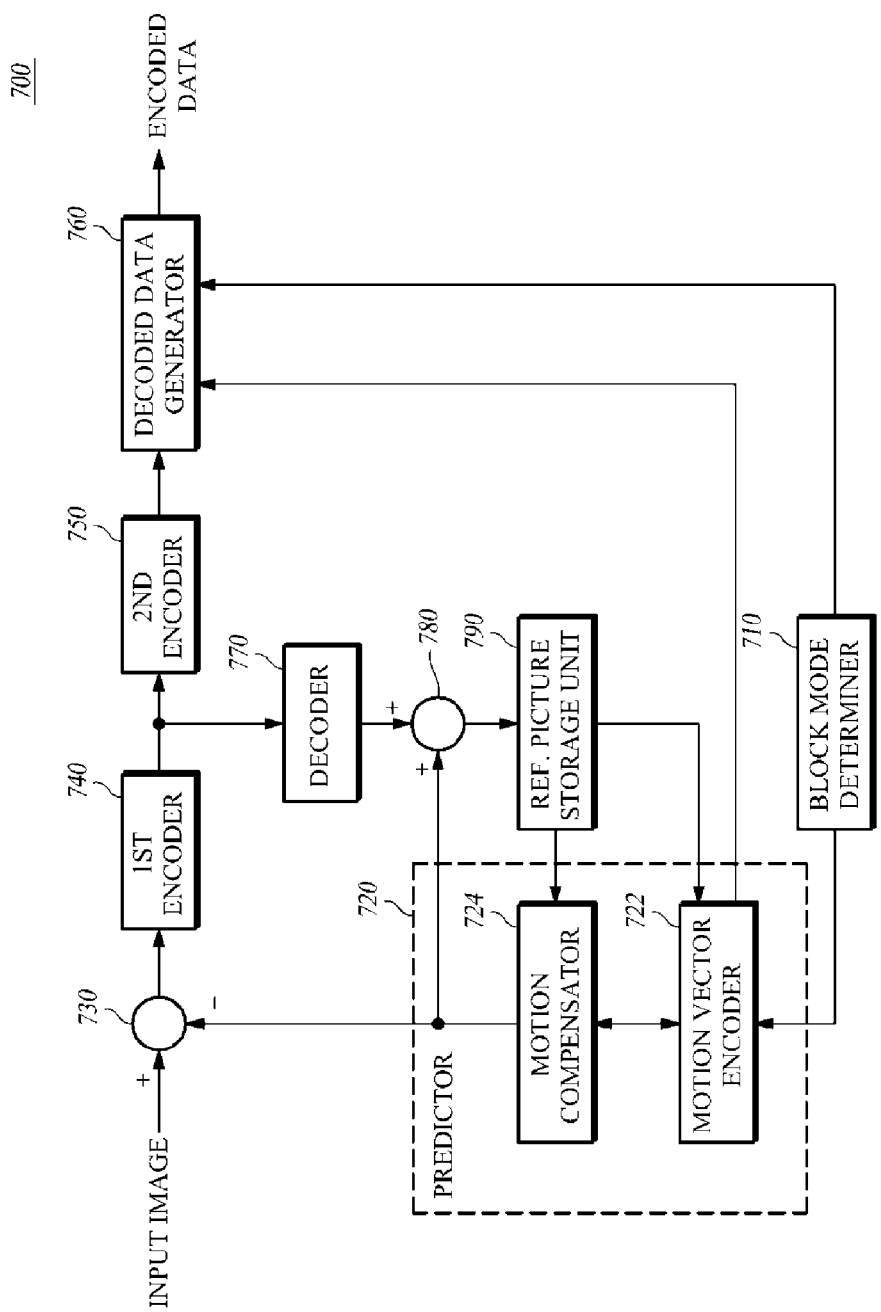
FIG. 7 is a block diagram showing an image encoding apparatus according to an aspect.

FIG. 7 is a block diagram schematically showing an image encoding apparatus according to an aspect.

The image encoding apparatus 700 according to an aspect includes a block mode determiner 710, a predictor 720, a subtractor 730, a first encoder 740, a second encoder 750, an encoded data generator 760, a decoder 770, an adder 780, and a reference picture storage unit 790. The image encoding apparatus 700 may be a personal computer (PC), a notebook computer, a personal digital assistant (PDA), portable multimedia player (PMP), PlayStation Portable (PSP), or mobile communication terminal, and includes various apparatuses, each of which is provided with a communication unit, such as a communication modem, for communicating with various devices through wired or wireless communication network, a memory for storing various programs and data for image encoding, and a microprocessor for executing programs and performing operations and control.

The block mode determiner 710 determines the block mode (e.g. block mode having a minimum rate-distortion) of a current block to be currently encoded in an image by applying a predetermined optimum criteria (e.g. rate-distortion criteria) to block modes selectable for the current block. If a block mode has been already set in the image encoding apparatus 700, the block mode determiner 710 is not necessarily included and may be selectively omitted in the image encoding apparatus 700.

The predictor 720 generates and outputs a predicted block by predicting the current block. Specifically, the predictor 720 predicts a pixel value of each pixel of a current block to be currently encoded in an image, thereby generating a predicted block having the predicted pixel value of each pixel. In the case of performing an inter prediction, the predictor 720 may include a motion vector encoder 722 and a motion compensator 724 as shown. Further, according to whether the motion vector decoding apparatus can predict optimum motion vectors for multiple reference pictures determined for the current motion vector of the current block, the predictor 720 generates motion vector encoded data by encoding motion information on the multiple reference pictures by using optimum motion vectors or default motion vectors for multiple reference pictures preset by a motion vector encoding apparatus, and generates a predicted block of the current block by using current motion vectors for multiple reference pictures.

The motion vector encoder 722 can be implemented by the motion vector encoding apparatus 300 according to an aspect as described above with reference to FIG. 3, so a more detailed description thereof is omitted here. However, the motion vector encoder 722 can determine current motion vectors for multiple reference pictures, which are motion vectors of the current block for the multiple reference pictures, and can use various techniques including rate-distortion optimization in determining the current motion vectors for the multiple reference pictures.

The motion compensator 724 generates and outputs a predicted block of the current block by using the current motion vector for multiple reference pictures output from the motion vector encoder 722 and indicated by index information.

The subtractor 730 subtracts the predicted block from the current block, thereby generating a residual block. Specifically, the subtractor 730 calculates the difference between a pixel value of each pixel of the current block to be encoded and a pixel value of each pixel of the predicted block predicted by the predictor 720, thereby generating a residual block having a block type residual signal.

The first encoder 740 converts and quantizes a residual block, thereby outputting a quantized residual block. Specifically, the first encoder 740 converts the residual signal of the residual block to a frequency domain signal, so as to convert each pixel value of the residual block to a frequency coefficient and quantize the residual block having the frequency coefficient. For the conversion of the residual signal to a signal of the frequency axis, the first encoder 740 may use various transform techniques converting an image signal of a spatial axis to a signal of the frequency axis, such as Hadamard Transform, Discrete Cosine Transform (DCT)-based Transform, wherein the residual signal having been converted to the frequency domain serves as a frequency coefficient. Further, in quantizing the converted residual block, the first encoder 740 may use techniques, such as Dead Zone Uniform Threshold Quantization (DZUTQ), Quantization Weighted Matrix, and improved quantization thereof.

Although the first encoder 740 converts and quantizes the residual block in the above description, the first encoder 740 may omit the quantization after generating the residual block having the frequency coefficient by converting the residual signal of the residual block, may perform only the quantization while omitting the process of generating the residual block having the frequency coefficient by converting the residual signal of the residual block, or may even omit both the conversion and the quantization. In the case where both the conversion and the quantization are not performed, the first encoder 740 can be omitted from the image encoding apparatus 700 according to an aspect.

The second encoder 750 generates and outputs residual block encoded data by encoding a residual block output from the first encoder 740. Specifically, the second encoder 750 generates a quantization frequency coefficient sequence, a frequency coefficient sequence, or a signal sequence by scanning a quantization frequency coefficient, a frequency coefficient, or a residual signal of the residual block according to various scanning schemes, such as zigzag scan, and encodes the generated sequence by using various encoding schemes, such as entropy encoding. Meanwhile, the first encoder 740 and the second encoder 750 may be replaced by an integrated single encoder having their functions.

The encoded data generator 760 generates and outputs encoded data, which includes residual block encoded data output from the second encoder 750 and motion vector encoded data output from the motion vector encoder 722. The encoded data generator 760 may add information on the block mode for the current block preset or output from the block mode determiner 710 to the output encoded data. The encoded data generator 760 may be implemented by a multiplexer.

The decoder 770 dequantizes and then performs an inverse transform on the residual block having been quantized by the first encoder 740. Specifically, the decoder 770 generates residual blocks having frequency coefficients by dequantizing quantization frequency coefficients of quantized residual blocks, and generates residual blocks having pixel values, i.e. reconstructed residual blocks, by performing inverse transform on the dequantized residual blocks. For the dequantization and inverse transform, the decoder 770 may use inverse schemes of the transform scheme and quantization scheme used by the first encoder 740. Further, the decoder 770 may perform only the inverse transform without the dequantization when the first encoder 740 performs only the transform without the quantization, and may perform only the dequantization without the inverse transform when the first encoder 740 performs only the quantization without the transform. Moreover, if the first encoder 740 does not perform both the transform and the quantization or when the first encoder 740 is omitted from the image encoding apparatus 700, the decoder 770 also may not perform both the inverse transform and the dequantization or may be omitted from the image encoding apparatus 700.

The adder 780 reconstructs the current block by adding a predicted block predicted by the predictor 720 and a residual block reconstructed by the decoder 770. The reference picture storage unit 790 stores the reconstructed current block output from the adder 780 as a reference picture picture-by-picture, so that the predictor 720 can use the current block as a reference picture when encoding a next block of the current block or another block in the future.

Although not shown in FIG. 7, based on the H.264/AVC standard, the image encoding apparatus 700 according to an aspect may additionally include an intra predictor for intra prediction, and a deblocking filter for performing a deblocking filtering on the reconstructed current block. Further, based on the H.264/AVC standard, the first encoder 740 and the decoder 770 may additionally perform the transform and quantization (or inverse transform and dequantization) for a particular picture (e.g. intra picture). The deblocking filtering refers to an operation for reducing the block distortion generated during encoding of an image block-by-block, and may selectively employ one or more combinations of a method of applying a deblocking filter to the block boundary and the macro block boundary, a method of applying a deblocking filter to only the macro block boundary, and a method of using no deblocking filter.

Figure 8:
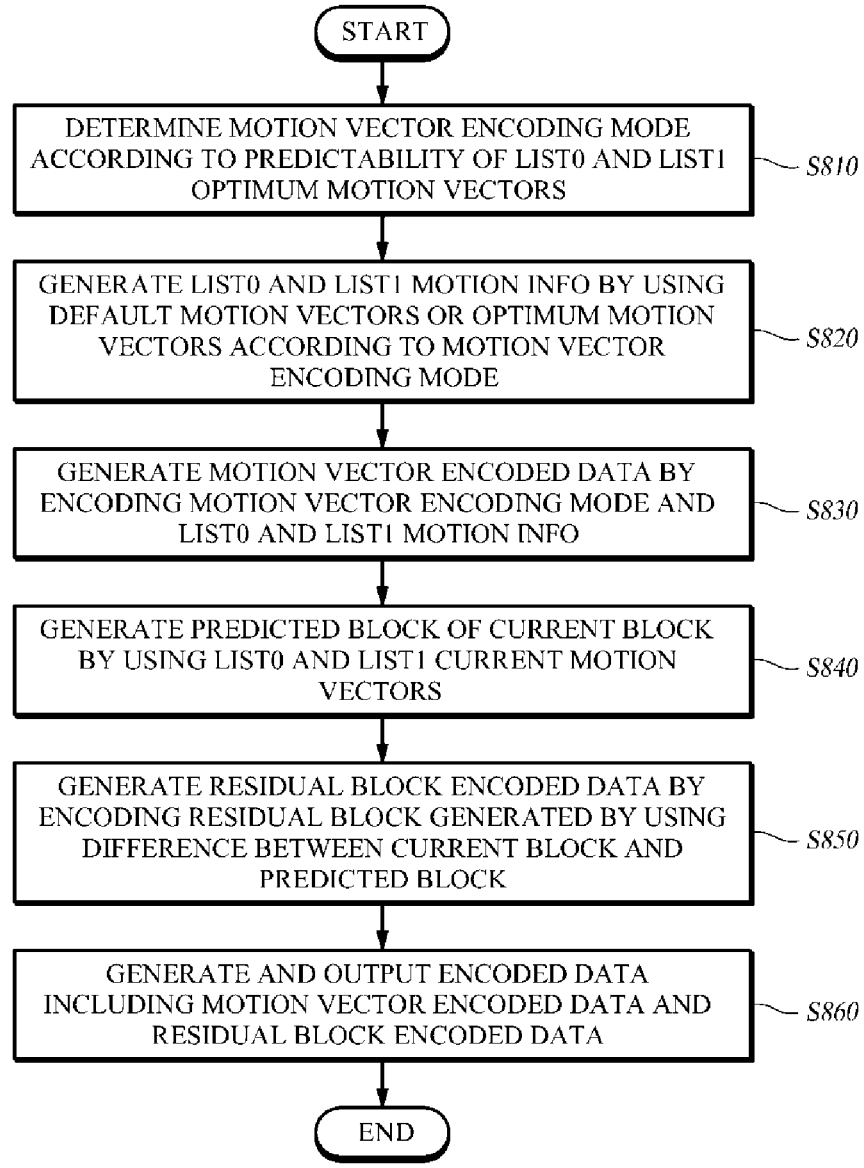
FIG. 8 is a schematic flow diagram showing an image encoding method according to an aspect.

FIG. 8 is a schematic flow diagram showing an image encoding method according to an aspect.

The image encoding apparatus 700 determines the motion vector encoding mode according to whether the motion vector decoding apparatus can predict optimum motion vectors for multiple reference pictures determined for the current motion vector of the current block (step S810). Specifically, as described above with reference to FIG. 3, the image encoding apparatus 700 determines the list0 and list1 optimum motion vectors and determines whether the motion vector decoding apparatus can predict the list0 and list1 optimum motion vectors, thereby determining the motion vector encoding mode. At this time, as described above with reference to FIG. 3, the motion vector encoding mode may be determined as a predictability mode or an unpredictability mode, and may be determined as different modes or a single mode for the respective multiple reference pictures.

The image encoding apparatus 700 generates motion information for multiple reference pictures by using optimum motion vectors for multiple reference pictures and default motion vectors for the multiple reference pictures according to the motion vector encoding mode (step S820). That is, as described above with reference to FIG. 3, the image encoding apparatus 700 generates list0 and list1 motion information by using the list0 and list1 optimum motion vectors or the list0 and list1 default motion vectors according to the motion vector encoding mode.

The image encoding apparatus 700 generates motion vector encoded data by encoding the motion vector encoding mode and motion information on multiple reference pictures (S830), generates a predicted block of the current block by using a current motion vector for multiple reference pictures (S840), generates residual block encoded data by encoding a residual block generated through subtraction between a predicted block and the current block (S850), and generates and outputs encoded data including motion encoded data and residual block encoded data (S860).

As described above, the encoded data encoded from an image by the image encoding apparatus 700 is transmitted to an image decoding apparatus in real time or non real time through a wired or wireless communication network, such as the Internet, LAN, wireless LAN, WiBro (Wireless Broadband) network also known as WiMax network, and mobile communication network, or through a communication interface, such as a cable or Universal Serial Bus (USB), so that the image decoding apparatus can reconstruct and reproduce the image.

Figure 9:
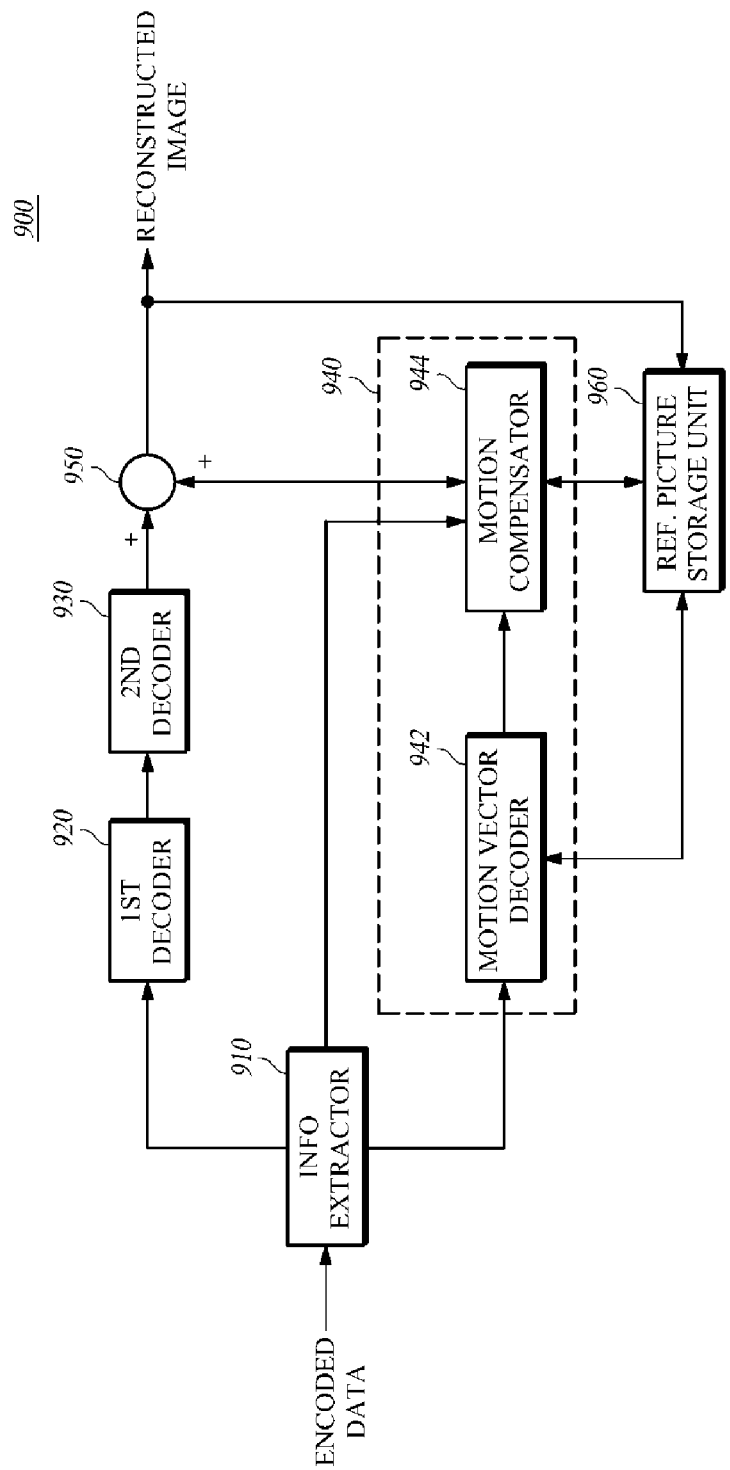
FIG. 9 is a block diagram showing an image decoding apparatus according to an aspect.

FIG. 9 is a block diagram showing an image decoding apparatus according to an aspect.

The image decoding apparatus 900 according to an aspect includes an information extractor 910, a first decoder 920, a second decoder 930, a predictor 940, an adder 950, and a reference picture storing unit 960. The image decoding apparatus 900 may be a personal computer (PC), a notebook computer, a personal digital assistant (PDA), portable multimedia player (PMP), PlayStation Portable (PSP), or mobile communication terminal, and includes various apparatuses, each of which is provided with a communication unit, such as a communication modem, for communicating with various devices through wired or wireless communication network, a memory for storing various programs and data for image encoding, and a microprocessor for executing programs and performing operations and control.

The information extractor 910 receives an input of encoded data, extracts information (e.g. identifier) on the block mode from the input encoded data, and outputs information on the extracted block mode. Further, when the block mode is a motion vector omission mode (for example, when the block mode is an intra 16×16 mode or an intra 4×4 mode), the information extractor 910 may extract and output only the residual block encoded data from the encoded data without extracting the motion vector encoded data. In contrast, when the block mode is not a motion vector omission mode (for example, when the block mode is an inter 16×16 mode, an inter 4×4 mode, or P8X8 mode), the information extractor 910 extracts and outputs the motion vector encoded data and the residual block encoded data from the encoded data. At this time, the information extractor 910 may additionally extract and output index information of reference pictures from the encoded data.

The first decoder 920 decodes the residual block encoded data output from the information extractor 910. That is, the first decoder 920 generates a quantization frequency coefficient sequence by decoding binary data of the residual block encoded data using an entropy encoding technique, etc., and generates a residual block having the quantization frequency coefficient sequence by inverse-scanning the residual block encoded data according to various scanning schemes, such as zigzag scan. If the binary data of the residual block encoded data is binary data having an encoded frequency coefficient, the residual block decoded by the first decoder 920 is a residual block having a frequency coefficient. In contrast, if the binary data of the residual block encoded data is binary data obtained by encoding binary data, which is neither transformed nor quantized, the residual block decoded by the first decoder 920 is a residual block having a residual signal.

The second decoder 930 reconstructs the residual block by dequantizing and inverse-transforming the residual block decoded by the first decoder 920. Specifically, the second decoder 930 reconstructs a residual block having a residual signal by dequantizing the quantization frequency coefficient of the decoded residual block output from the first decoder 920 and then inverse-transforming the dequantized quantization frequency coefficient. If the residual block decoded by the first decoder 920 has a quantization frequency coefficient, the second decoder 930 performs both the dequantization and the inverse transform. However, if the residual block decoded by the first decoder 920 has a frequency coefficient, the second decoder 930 may perform only the inverse transform without the dequantization. Moreover, if the residual block decoded by the first decoder 920 has only a residual signal, the second decoder 930 may not perform both the dequantization and the inverse transform, or the second decoder 930 may be omitted from the image decoding apparatus 900. Although the first decoder 920 and the second decoder 930 are separately constructed and shown in FIG. 9, they may be constructed as an integrated single decoder (not shown) having their functions.

The predictor 940 generates a predicted block by predicting a current block. The predictor 940 may include a motion vector decoder 942 and a motion compensator 944. The predictor 940 reconstructs the motion information for multiple reference pictures and the motion vector encoding mode by decoding the motion vector encoded data output from the information extractor 910, reconstructs a current motion vector for multiple reference pictures by using default motion vectors preset with the motion vector encoding apparatus or estimated optimum motion vectors for multiple reference pictures determined according to the reconstructed motion vector and vector encoding mode, and generates a predicted block of the current block by using a current motion vector for multiple reconstructed reference pictures.

The motion vector decoder 942 can be implemented by the motion vector decoding apparatus 500 according to an aspect as described above with reference to FIG. 5. That is, the motion vector decoder 942 reconstructs the motion vector encoding mode and the list0 and list1 motion information by decoding the motion vector encoded data, determines selected list0 and list1 optimum motion vectors or preset list0 and list1 default motion vectors as the list0 and list1 predicted motion vectors according to whether the motion vector encoding mode is a predictability mode or an unpredictability mode, and reconstructs the list0 and list1 current motion vectors by using the list0 and list1 motion information and the list0 and list1 predicted motion vectors.

The motion compensator 944 generates a predicted block by predicting a reference block, which is indicated by the list0 and list1 predicted motion vectors reconstructed by the motion vector decoder 942 in the reference pictures stored in the reference picture storing unit 960, as a predicted block of the current block. In using the reference pictures, if index information on the reference pictures is output from the information extractor 910, the motion vector decoder 942 can use the reference pictures identified by the index information among the reference pictures stored in the reference picture storing unit 960.

The adder 950 reconstructs the current block by adding the reconstructed residual block output from the second decoder 930 to the predicted block output from the predictor 940. The reconstructed current blocks are accumulated picture-by-picture, so that the accumulated current blocks can be output as a reconstructed image or stored as a reference picture in the reference picture storing unit 960, and may be used for prediction of the next block.

Although not shown in FIG. 9, based on the H.264/AVC standard, the image decoding apparatus 900 according to an aspect may additionally include an intra predictor for intra prediction, and a deblocking filter for performing a deblocking filtering on the reconstructed current block. Further, based on the H.264/AVC standard, the image decoding apparatus 900 may additionally perform the inverse transform and dequantization for a particular picture (e.g. intra picture).

Figure 10:
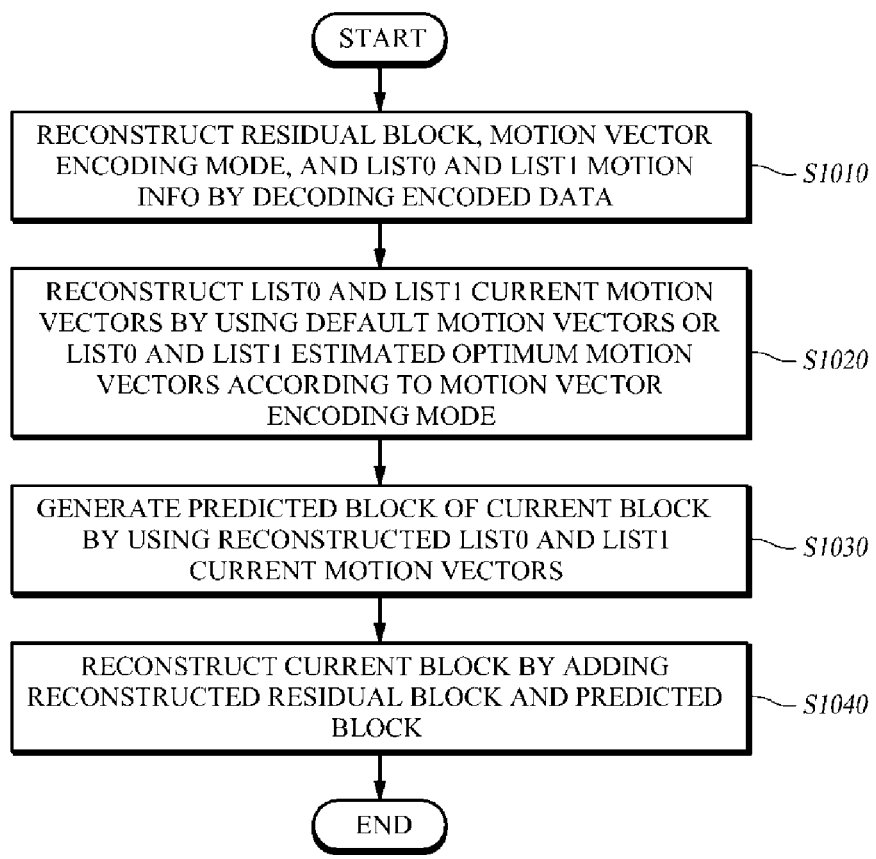
FIG. 10 is a schematic flow diagram showing an image decoding method according to an aspect.

FIG. 10 is a schematic flow diagram showing an image decoding method according to an aspect.

The image decoding apparatus 900, which has received and stored encoded data for an image through a wired/wireless communication network or cable, decodes the encoded data and reconstructs the image, in order to reproduce the image according to user's selection or the algorithm of another program being executed.

To this end, the image decoding apparatus 900 decodes input encoded data to thereby reconstruct the residual bloc, the motion vector encoding mode, and the motion information for multiple reference pictures (step S1010), and reconstructs the current motion vector for multiple reference pictures by using default motion vectors for the multiple reference pictures or estimated optimum motion vectors for the multiple reference pictures according to the reconstructed motion vector encoding mode (step S1020).

That is, the image decoding apparatus 900 reconstructs the residual bloc, the motion vector encoding mode, and the list0 and list1 motion information for multiple reference pictures by decoding input encoded data, and reconstructs the list0 and list1 current motion vectors by using the list0 and list1 default motion vectors or the list0 and list1 estimated optimum motion vectors according to the reconstructed motion vector encoding mode.

Then, the image decoding apparatus 900 generates a predicted block by predicting the current block by using the reconstructed current vectors for the multiple reference pictures, that is, by using the list0 and list1 current motion vectors (step S1030), and reconstructs the current blocks by adding the reconstructed residual blocks and the predicted blocks (step 1040).

The sequence between the above-described steps in FIGS. 4, 6, 8, and 10 is only a sequence according to an aspect of the present disclosure and may be changed to another sequence without escaping from the scope of the present disclosure.

Further, although the motion vector prediction modes are classified into a predictability mode and an unpredictability mode in the above description, the present disclosure is not limited to this classification. Instead, the motion vector prediction modes may include a mode in which default motion vectors for multiple preset reference pictures are used as predicted motion vectors for the multiple reference pictures, and a mode in which optimum motion vectors for multiple preset reference pictures are used as predicted motion vectors for the multiple reference pictures according to preset criteria or methods.

According to an aspect, the motion vector encoding apparatus 300 or image encoding apparatus 700 can select and determine a predicted mode for multiple reference pictures, so that it is possible to minimize the bit quantity required for encoding of current motion vectors for multiple reference pictures by using motion vectors equal or similar to the current motion vectors for the multiple reference pictures as predicted motion vectors for the multiple reference pictures, thereby improving the encoding efficiency or compression efficiency.

Further, according to an aspect, instead of directly notifying the image decoding apparatus of the predicted motion vectors for selected multiple reference pictures, the motion vector encoding apparatus 300 or the image encoding apparatus 700 may transmit only information, such as motion information or a motion vector encoding mode, to the motion vector decoding apparatus 500 or the image decoding apparatus 900 so that the motion vector decoding apparatus 500 or the image decoding apparatus 900 can obtain the predicted motion vectors by itself, or may share a function for finding the predicted motion vectors with the motion vector decoding apparatus 500 or the image decoding apparatus 900. As a result, it is possible to prevent the occurrence of additional bits for notifying of the predicted motion vectors for the multiple reference pictures, thereby further improving the encoding efficiency and the decoding efficiency.

Further, according to an aspect applied to an image processing service, it is possible to encode an image with a small bit quantity, which can provide users with a highly satisfactory service. Especially, in a wireless mobile environment, which may have a relatively small bandwidth, a large data loss and delay in comparison with a wired environment, it is possible to expect a larger effect.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

As described above, according to various embodiments of the present disclosure, it is possible to more accurately predict a predicted motion vector of the current motion vector for multiple reference pictures and reduce the bit quantity required for encoding of motion vectors, so as to improve the compression efficiency.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. A video decoding method using an inter prediction, the method performed by a video decoding apparatus including a microprocessor and comprising:
    reconstructing a first differential motion vector and a second differential motion vector of a current block by decoding encoded data;
    deriving a first predicted motion vector and a second predicted motion vector of the current block from one or more neighboring blocks of the current block;
    generating a first motion vector of the current block by adding the first candidate motion vector to the first differential motion vector, and a second motion vector of the current block by adding the second candidate motion vector to the second differential motion vector;
    generating a predicted block of the current block by using the first and second motion vectors;
    reconstructing a residual block by decoding residual signals included in the encoded data; and
    adding each pixel value of the predicted block to a corresponding pixel value of the residual block,
    wherein the reconstruction of the residual block comprises:
        identifying one or more conditions for enabling an inverse quantization and an inverse transform;
        skipping both of the inverse quantization and the inverse transform for the decoded residual signals to thereby reconstruct the residual block from the decoded residual signals, when the identified one or more conditions indicate skipping of both the inverse quantization and the inverse transform;
        inversely quantizing the decoded residual signals and skipping the inverse transform for the inversely quantized residual signals to thereby reconstruct the residual block from the inversely quantized residual signals, when the identified one or more conditions indicate skipping of the inverse transform; and
        inversely quantizing the decoded residual signals and inversely transforming the inversely quantized residual signals to thereby reconstruct the residual block from the inversely quantized and inversely transformed residual signals, when the identified one or more conditions indicate non-skipping of both the inverse quantization and the inverse transform.

2. The method of claim 1, wherein the derivation of the first and second predicted motion vectors comprises:
    deriving, by using motion vectors of the one or more neighboring blocks, a first set of candidate motion vectors and a second set of candidate motion vectors;
    selecting a first candidate motion vector from the first set of candidate motion vectors and a second candidate motion vector from the second set of candidate motion vectors; and
    setting the first predicted motion vector to the selected the first candidate motion vector, and the second predicted motion vector to the selected the second candidate motion vector.

3. The method of claim 2, wherein the one or more neighboring blocks are selected from spatially neighboring blocks of the current block located in a current picture and a block located in a reference picture decoded before the current picture, wherein a position of the block in a reference picture is determined based on a position of the current block in the current picture.

4. The method of claim 3, wherein the spatially neighboring blocks include one or more of blocks located at left, upper, upper right and upper left sides of the current block.

5. The method of claim 2, wherein the derivation of the first set of candidate motion vectors and the second set of candidate motion vectors comprises:
comparing between two elements included in the first set or included in the second set; and
excluding one of the two elements from the first set or the second set when the two elements have the same value.

6. The method of claim 2, wherein the first candidate motion vector and the second candidate motion vector are selected based on information included in the encoded data.

7. The method of claim 1, wherein the one or more conditions for enabling the inverse quantization and the inverse transform are identified based on information included in the encoded data.

8. A video decoding apparatus using an inter prediction, the apparatus comprising:
an information extractor configured to reconstruct a first differential motion vector and a second differential motion vector of a current block by decoding encoded data;
a predictor configured to
derive a first predicted motion vector and a second predicted motion vector of the current block from one or more neighboring blocks of the current block,
generate a first motion vector of the current block by adding the first candidate motion vector to the first differential motion vector, and a second motion vector of the current block by adding the second candidate motion vector to the second differential motion vector, and
generate a predicted block of the current block by using the first and second motion vectors;
a decoder configured to reconstruct a residual block by decoding residual signals included in the encoded data; and
an adder configured to add each pixel value of the predicted block to a corresponding pixel value of the residual block,
wherein the decoder is further configured to
identify one or more conditions for enabling an inverse quantization and an inverse transform; and
skipping both of the inverse quantization and the inverse transform for the decoded residual signals to thereby reconstruct the residual block from the decoded residual signals, when the identified one or more conditions indicate skipping of both the inverse quantization and the inverse transform,
inversely quantizing the decoded residual signals and skipping the inverse transform for the inversely quantized residual signals to thereby reconstruct the residual block from the inversely quantized residual signals, when the identified one or more conditions indicate skipping of the inverse transform, and
inversely quantizing the decoded residual signals and inversely transforming the inversely quantized residual signals to thereby reconstruct the residual block from the inversely quantized and inversely transformed residual signals, when the identified one or more conditions indicate non-skipping of both the inverse quantization and the inverse transform.

9. The apparatus of claim 8, wherein the predictor derives the first and second predicted motion vectors by
deriving, by using motion vectors of the one or more neighboring blocks, a first set of candidate motion vectors and a second set of candidate motion vectors;
selecting a first candidate motion vector from the first set of candidate motion vectors and a second candidate motion vector from the second set of candidate motion vectors; and
setting the first predicted motion vector to the selected the first candidate motion vector, and the second predicted motion vector to the selected the second candidate motion vector.

10. The apparatus of claim 9, wherein the one or more neighboring blocks are selected from spatially neighboring blocks of the current block located in a current picture and a block located in a reference picture decoded before the current picture, wherein a position of the block in a reference picture is determined based on a position of the current block in the current picture.

11. The apparatus of claim 10, wherein the spatially neighboring blocks include one or more of blocks located at left, upper, upper right and upper left sides of the current block.

12. The apparatus of claim 9, wherein the predictor is configured to compare between two elements included in the first set or included in the second set, and exclude one of the two elements from the first set or the second set when the two elements have the same value.

13. The apparatus of claim 9, wherein the predictor is configured to select the first candidate motion vector and the second candidate motion vector, based on information included in the encoded data.

14. The apparatus of claim 8, wherein the decoder is configured to identify the one or more conditions for enabling the inverse quantization and the inverse transform, based on information included in the encoded data.

* * * * *